(12) United States Patent
Tkadlec

(10) Patent No.: US 9,118,221 B2
(45) Date of Patent: Aug. 25, 2015

(54) MAGNETIC PROPULSION MOTOR

(71) Applicant: Future Force, LLC, Roseville, MN (US)

(72) Inventor: Mike Tkadlec, Oakdale, MN (US)

(73) Assignee: Future Force, LLC, Roseville, MN (US)

( * ) Notice: Subject to any disclaimer, the term of this patent is extended or adjusted under 35 U.S.C. 154(b) by 0 days.

(21) Appl. No.: 13/975,782

(22) Filed: Aug. 26, 2013

(65) Prior Publication Data

US 2014/0062095 A1    Mar. 6, 2014

Related U.S. Application Data

(63) Continuation of application No. 13/337,429, filed on Dec. 27, 2011, now Pat. No. 8,519,584, which is a continuation of application No. 12/548,233, filed on Aug. 26, 2009, now Pat. No. 8,084,904, which is a (Continued)

(51) Int. Cl.
| | |
|---|---|
| *H02K 7/06* | (2006.01) |
| *H02K 1/00* | (2006.01) |
| *H02K 49/10* | (2006.01) |
| *H02K 53/00* | (2006.01) |
| *F03D 9/00* | (2006.01) |
| *H02K 7/18* | (2006.01) |

(52) U.S. Cl.
CPC *H02K 1/00* (2013.01); *F03D 9/002* (2013.01); *H02K 49/102* (2013.01); *H02K 53/00* (2013.01); *H02K 7/1823* (2013.01); *Y02E 10/725* (2013.01)

(58) Field of Classification Search
CPC .................................................. H02K 49/102
USPC .............................................. 310/20, 80, 152
See application file for complete search history.

(56) References Cited

U.S. PATENT DOCUMENTS

| | | | |
|---|---|---|---|
| 4,179,633 A | * | 12/1979 | Kelly .............................. 310/80 |
| 4,207,773 A | | 6/1980 | Stahovic |
| 4,600,849 A | | 7/1986 | Lawson et al. |

(Continued)

FOREIGN PATENT DOCUMENTS

JP    2005245079    9/2005

OTHER PUBLICATIONS

International Search Report for related PCT Application No. PCT/US2005/023704 mailed Sep. 25, 2006 (3 pp.).

(Continued)

*Primary Examiner* — Hanh Nguyen
(74) *Attorney, Agent, or Firm* — Winthrop & Weinstine, P.A.

(57) ABSTRACT

The present disclosure relates to a magnetic motor including a drive magnet, a motion magnet, and an acceleration field. The drive magnet includes magnetic shielding, typically on a portion thereof, altering the magnetic field of the drive magnet. In some embodiments, the motion magnet has a cross-section that is generally in the shape of a 'V' or 'A'. The acceleration field is created by the interaction between the drive magnet and the motion magnet as the motion magnet is passed through the altered magnetic field of the drive magnet. The altered magnetic field of the drive magnet may often be near a first end of the drive magnet. In further embodiments, the motion magnet can be operably coupled to an output shaft and rotate around the central axis of the output shaft. The present disclosure, also relates to a device, including the magnetic motor, for generating energy from a turbine.

10 Claims, 24 Drawing Sheets

Related U.S. Application Data continuation-in-part of application No. 12/135,614, filed on Jun. 9, 2008, now Pat. No. 7,777,377, which is a continuation of application No. 11/617,852, filed on Dec. 29, 2006, now Pat. No. 7,385,325, which is a continuation of application No. PCT/US2005/023704, filed on Jun. 30, 2005.

(60) Provisional application No. 60/584,298, filed on Jun. 30, 2004.

(56) References Cited

U.S. PATENT DOCUMENTS

| | | |
|---|---|---|
| 4,906,060 A | 3/1990 | Claude |
| 5,594,289 A * | 1/1997 | Minato .................. 310/152 |
| 6,084,322 A | 7/2000 | Rounds |
| 6,411,001 B1 | 6/2002 | Henderson et al. |
| 6,433,453 B1 | 8/2002 | Kitayoshi |
| 6,867,514 B2 | 3/2005 | Fecera |
| 6,930,421 B2 | 8/2005 | Wise |
| 7,291,944 B2 | 11/2007 | Wilt, Jr. et al. |
| 7,385,325 B2 | 6/2008 | Tkadlec |
| 7,777,377 B2 | 8/2010 | Tkadlec |
| 8,084,904 B2 | 12/2011 | Tkadlec |
| 2004/0041479 A1 | 3/2004 | French |
| 2005/0116566 A1 | 6/2005 | Nickoladze et al. |
| 2007/0145845 A1 | 6/2007 | Tkadlec |

OTHER PUBLICATIONS

International Search Report of PCT/US2010/046626. Issued by the Korean Intellectual Property Office on Apr. 28, 2011. 3 pages.

* cited by examiner

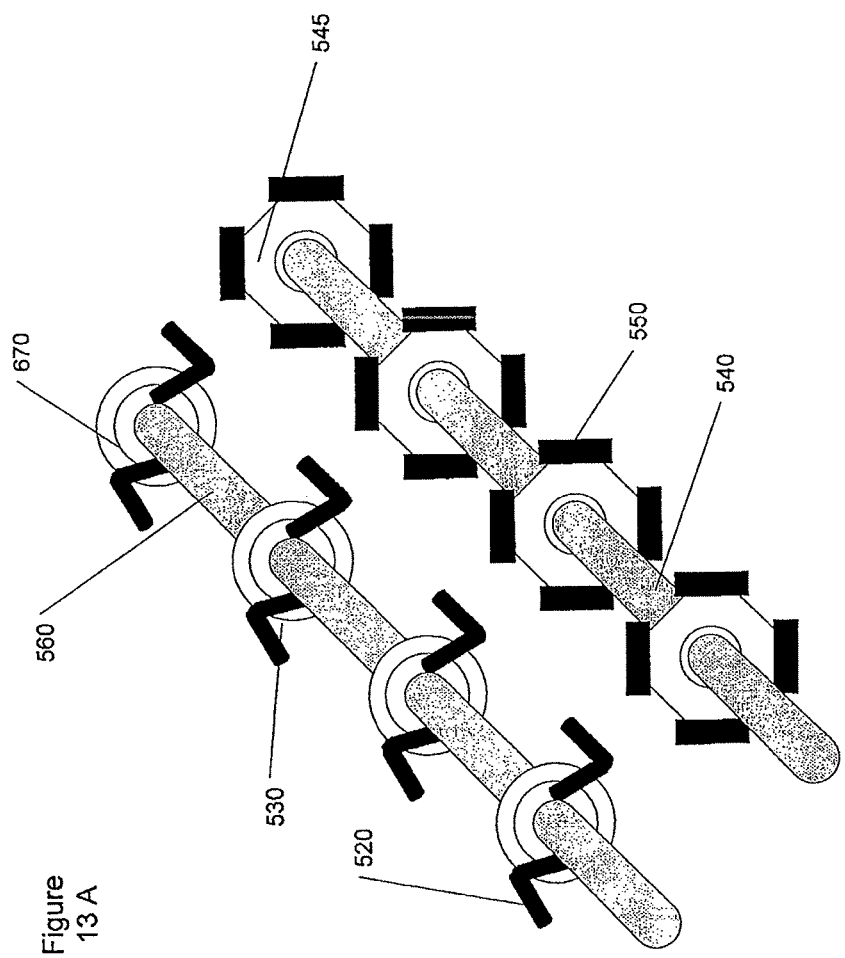

MAGNETIC PROPULSION MOTOR

CROSS-REFERENCE TO RELATED APPLICATIONS

This application is a continuation of U.S. patent application Ser. No. 13/337,429, filed Dec. 27, 2011, now U.S. Pat. No. 8,519,584, which is a continuation of U.S. patent application Ser. No. 12/548,233, filed Aug. 26, 2009, now U.S. Pat. No. 8,084,904, which is a continuation-in-part of U.S. patent application Ser. No. 12/135,614, filed Jun. 9, 2008, now U.S. Pat. No. 7,777,377, which is a continuation of U.S. patent application Ser. No. 11/617,852, filed Dec. 29, 2006, now U.S. Pat. No. 7,385,325, which is a continuation of International application number PCT/US2005/023704, filed Jun. 30, 2005, which claims priority to U.S. provisional patent application Ser. No. 60/584,298, filed Jun. 30, 2004, all of which are hereby incorporated by reference in their entirety.

FIELD OF THE INVENTION

The present disclosure relates to a magnetic propulsion motor and power transmission system. In particular, the present disclosure relates to a motor and gearing system, wherein power and/or torque is generated using magnets and magnetic fields. Magnets are accelerated through the magnetic fields creating a rotational movement about an axis.

BACKGROUND OF THE INVENTION

Magnetic propulsion has traditionally not worked effectively in the past due to magnetic lock. That is, it takes as much energy to enter into a magnetic field as is generated leaving the field.

Present magnetic propulsion motors have not been effective in diminishing or eliminating magnetic lock. Present motors use a magnetic field that creates either an attracting force or a repelling force, but not both. Additionally, present motors do not take into consideration the shape of the motion magnets or the effect, in certain configurations, that magnetic shielding can have. Thus, present motors are generally inefficient.

Therefore, there is a need in the art for a magnetic propulsion motor that eliminates or mitigates magnetic lock. The present disclosure relates to a magnetic propulsion motor without the disadvantages embodied in present motors.

BRIEF SUMMARY OF THE INVENTION

The present disclosure, in one embodiment, relates to a magnetic motor including a drive magnet, a motion magnet, and an acceleration field. The drive magnet includes magnetic shielding, typically on a portion thereof, altering the magnetic field of the drive magnet. In some embodiments, the motion magnet has a cross-section that is generally in the shape of a 'V' or 'A'. The acceleration field is created by the interaction between the drive magnet and the motion magnet as the motion magnet is passed through the altered magnetic field of the drive magnet. The altered magnetic field of the drive magnet may often be near a first end of the drive magnet. In further embodiments, the motion magnet can be operably coupled to an output shaft and rotate around the central axis of the output shaft. In still further embodiments, a second motion magnet can be operably coupled to the output shaft at a location that is longitudinally up or down shaft from the first motion magnet. The first motion magnet and the second motion magnet may further be radially offset from one another around the output shaft. A second drive magnet can be added, and another acceleration field may be created by the interaction between the second drive magnet and the second motion magnet as the second motion magnet is passed through the altered magnetic field of the second drive magnet.

The present disclosure, in another embodiment, relates to a method of creating a magnetic acceleration field. The method includes altering the magnetic field of a drive magnet, and intermittently passing a motion magnet proximate the drive magnet to create an interaction between the magnetic fields of the motion magnet and the drive magnet, such that the interaction causes the motion magnet to be driven away from the drive magnet. In some embodiments, altering the magnetic field of the drive magnet includes magnetically shielding a portion of the drive magnet. The method may further involve operably coupling a drive assembly, having an input shaft, to the drive magnet such that the drive magnet rotates around the central axis of the input shaft and is configured to move the drive magnet away from the motion magnet, and return the drive magnet proximate to the motion magnet. In some embodiments, a windmill blade can be operably coupled to the input shaft to drive the input shaft.

The present disclosure, in yet another embodiment, relates to a device for generating energy from a turbine. The device includes a turbine, a magnetic motor, a rotatable drive axle, and a rotatable motion axle. The magnetic motor includes a drive magnet, a motion magnet, and an acceleration field. The drive axle is operably coupled to the drive magnet and the turbine, wherein rotation of the turbine causes rotation of the drive axle and rotation of the drive axle causes the drive magnet to rotate around a central axis of the drive axle. The motion axle is operably coupled to the motion magnet and an electrical generator, such that rotation around a central axis of the motion axle by the motion magnet causes the motion axle to rotate and drive the electrical generator.

While multiple embodiments are disclosed, still other embodiments of the present disclosure will become apparent to those skilled in the art from the following detailed description, which shows and describes illustrative embodiments of the present disclosure. As will be realized, the invention is capable of modifications in various obvious aspects, all without departing from the spirit and scope of the present disclosure. Accordingly, the drawings and detailed description are to be regarded as illustrative in nature and not restrictive.

DETAILED DESCRIPTION

The present disclosure relates to a magnetic propulsion motor and power transmission system. More specifically, the present disclosure relates to a system and method of generating power and/or torque by using magnets and magnetic fields. Output of power and/or torque is obtained from rotating motion magnets through one or more magnetic acceleration fields created by drive magnets. The number and arrangement of magnets can be adjusted to affect output speed, power and/or torque.

Figure 1:
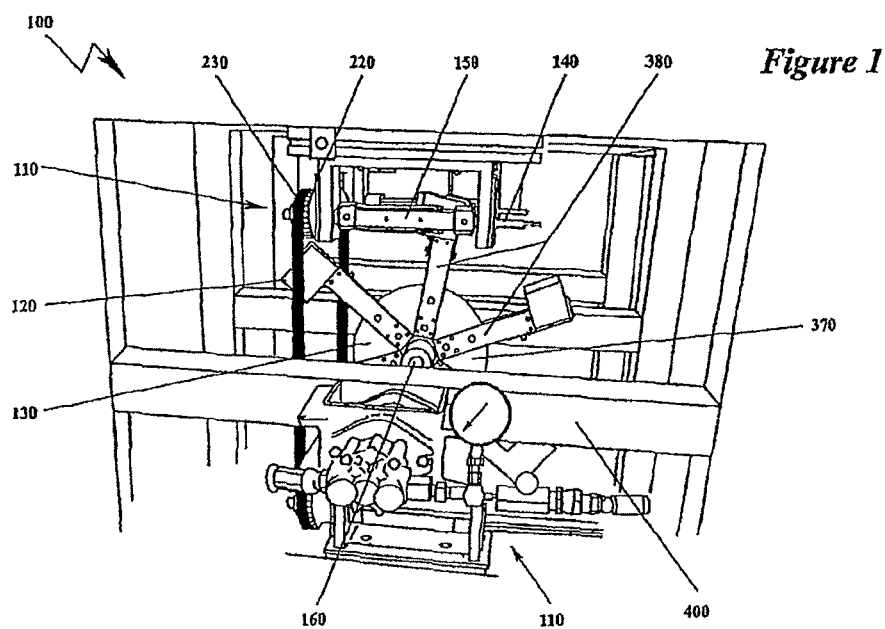
FIG. 1 is a side view of one embodiment of a magnetic propulsion motor of the present disclosure.

According to one embodiment of the present disclosure shown in FIG. 1, a magnetic propulsion motor 100 comprises at least one acceleration chamber 105 (shown in FIG. 2) within main frame 400. Each acceleration chamber 105 includes at least one acceleration field generator 110 and at least one motion magnet 120 and a rotating hub 130 coupled thereto. As described in more detail below and shown in FIG. 9A, the rotating hub 130 generally comprises a base 370 and an extension arm 380 for each motion magnet 120. The extension arm 380 secures the motion magnet 120 to the base 370.

Figure 3:
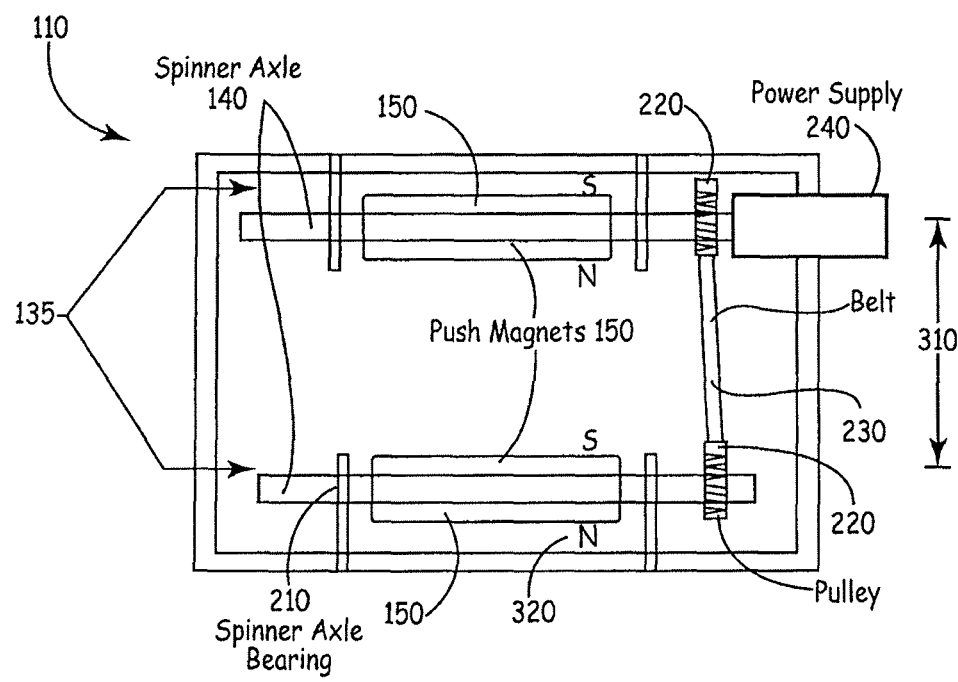
FIG. 3 is a schematic view of one embodiment of an acceleration field generator of the present disclosure.
Figure 4:
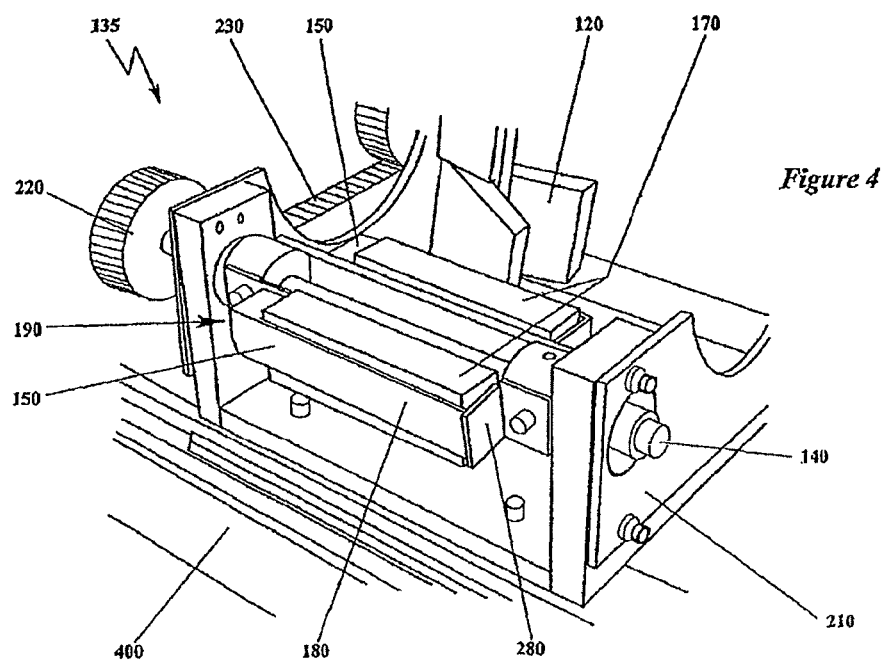
FIG. 4 is a perspective view of one embodiment of a spinner assembly of the present disclosure.

The rotation of the rotating hub 130 causes each motion magnet 120 to pass through a magnetic acceleration field created by an acceleration field generator 110. With reference to FIGS. 1 and 3, an acceleration field generator 110 comprises two spinner assemblies 135, each spinner assembly 135 having a spinner axle 140 and two push magnets 150. As seen in FIG. 4, spinner assembly 135 further includes two magnet cradles 170, each magnet cradle 170 rotatably coupling the push magnets 150 to spinner axle 140 such that two push magnets 150 freely rotate, or "spin," about the spinner axle 140. Referring back to FIG. 1, an acceleration chamber within the main frame 400 further comprises a main axle 160 coupled with the rotating hub 130. The rotating hub 130 is rotationally secured to the main axle 160 such that hub 130 and motion magnets 120 may rotate about the axle 160.

Figure 2:
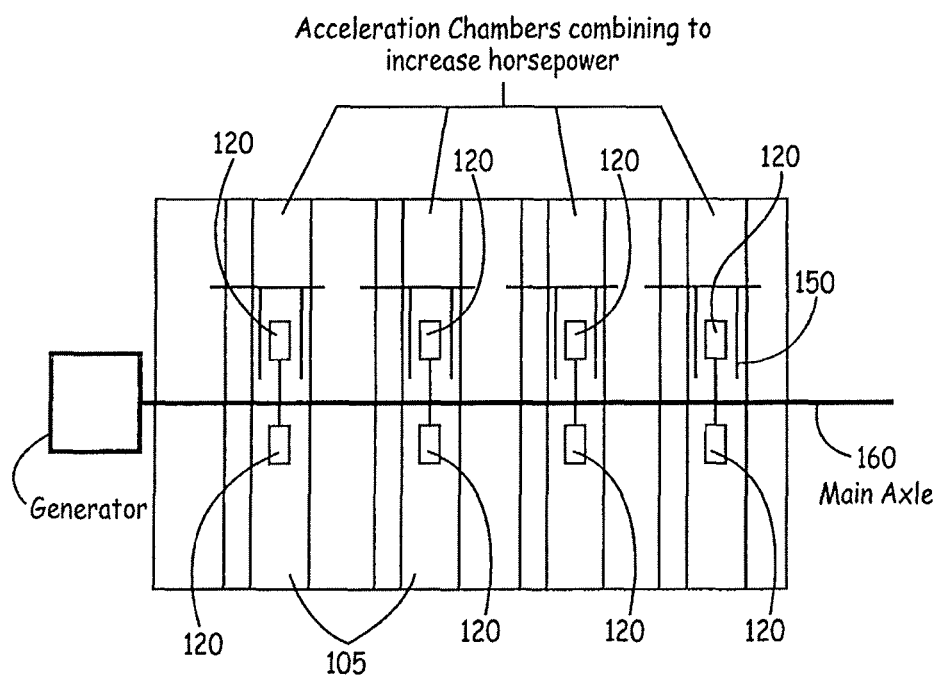
FIG. 2 is a schematic view of one embodiment of a multiple chamber, magnetic propulsion motor of the present disclosure.

In alternate embodiments, the magnetic propulsion motor 100 may have multiple acceleration chambers 105, as shown in FIG. 2. In such situations, the rotating hub 130 of each chamber 105 may be coupled with a separate axle 160. Alternatively, the rotating hub 130 of any one of the chambers 105 may share an axle 160 with any number of hubs 130 of the remaining chambers 105. Where multiple hubs 130 share the same axle 160, torque and/or power are increased. Therefore, any desired amount of power can be achieved by adding more chambers 105.

In one embodiment of the present disclosure, shown, for example, in FIG. 1, a magnetic propulsion motor 100 comprises two acceleration field generators 110. In other embodiments, it may be desirable to have more or fewer acceleration field generators 110. Typically, the acceleration field generators 110 are evenly placed circumferentially around the rotating hub 130 such that the motion magnets 120 pass through the acceleration field created by each of the acceleration field generators 110, as will be described in further detail.

With reference to FIGS. 3 and 4, an acceleration field generator 110 generally comprises two spinner assemblies 135. In alternate embodiments, an acceleration field generator 110 may comprise more or fewer spinner assemblies 135. Each spinner assembly 135 has two push magnets 150 that are securely attached to a spinner axle 140 by housing each push magnet 150 in a magnet cradle 170 rotatably attached to the spinner axle 140 and that rotate relative to the spinner axle 140. In alternate embodiments, each spinner assembly 135 may comprise more or fewer push magnets 150. The push magnets 150 are typically situated on substantially opposing sides of the spinner axle 140. The push magnets 150 may be neodymium iron boron (neodymium) rare earth magnets. However, those skilled in the art will recognize that other known magnets may also be used for the push magnets 150. The kind of magnet used as the push magnet 150 may have an effect on the strength of the repulsive and/or attractive forces acting on a motion magnet 120 in an acceleration field, since various kinds of magnetic materials may differ in their amount of magnetic strength.

Another factor that may affect the strength of the magnetic forces generated within an acceleration field is the separation distance or gap between push magnets 150 and motion magnets 120 as they rotate past each other in the acceleration field. In general, the strength of attractive and repulsive forces between two magnets is in an inverse relationship with the distance between the magnets, decreasing rapidly as the gap between the magnets increases. This property may be used in several ways during the operation of various embodiments of the present disclosure.

For instance, in order to control or adjust the power and/or torque output in various embodiments of the present disclosure, the rotational paths of the motion 120 and push 150 magnets may be moved closer or farther away from each other. This may be accomplished, for example, by the positioning of the main 160 and spinner 140 axles, adjustments to the size and positioning of the rotation hubs 130 and spinner assembly 135, and/or the positioning of the motion magnets 120 and push magnets 150.

The inverse relationship between the distance between two magnets and the strength of attractive and repulsive magnetic forces created therein may also be a factor in aiding entry and exit from an acceleration field in some embodiments of the present disclosure. The rotation of the rotation hubs 130 and spinner assemblies 135 causes motion magnets 120 and/or push magnets 120 to rotate closer to and farther away from each other. For example, motion magnet 120 may rotate into and enter an acceleration field when a push magnet 150 has been rotated by a spinner assembly 135 to be farther away from motion magnet 120, as discussed below and shown in FIGS. 7A-D. The repulsive magnetic force between the two magnets is decreased, which may allow the motion magnet 120 to enter the acceleration field. When motion magnet 120 has entered the acceleration field, spinner assembly 135 may rotate push magnet 150 closer to the motion magnet 120 to increase the repulsive magnetic forces between the magnets, pushing the motion magnet out of the acceleration field.

In various embodiments of the present disclosure, the shape and orientation of the motion and push magnets may also be adjusted to affect the distance between the two magnets as they rotate past each other. For example, an angled profile of a motion magnet 120 may cause the distance between the surfaces of the motion magnet and a push magnet 150 to vary as the motion magnet rotates past the push magnet.

Although repulsive and/or attractive forces in general diminish with increasing distance between two magnets, the forces between two magnets are also significantly affected by the shape of the magnetic field of the individual magnets. Magnets usually have non-uniform magnetic fields, such that field strength at all points at a given distance from a magnet surface is not constant. Thus, the repulsive and/or attractive forces between magnets depend not only on their distance from each other, but on their orientation and position relative to the shape of their respective magnetic fields. The dimensions and shape of a magnetic field for an individual magnet may be affected by magnet shape and the presence of magnetic shielding. Push magnets 150 and motion magnets 120 of the present disclosure may be shaped, oriented, and/or shielded to create an acceleration field and generate torque and/or power and reduce or eliminate magnetic lock.

Thus, with reference to FIG. 4, in one embodiment of the present disclosure, in addition to housing and securing push magnets 150, the magnet cradle 170 may provide magnetic shielding for push magnets 150, wherein the cradle 170 covers all or part of some of the faces of the push magnet 150 and appropriately redirects the magnetic force emanating from those faces. Because a magnetic field must always start at one pole and end at the other, magnetic shielding does not actually block a magnetic field. However, magnetic shielding may redirect a magnetic field through the shield, similar to a conductor, so that the magnetic field has lessened or no influence on objects passing by the magnet or side of the magnet that has magnetic shielding.

Figure 5A:
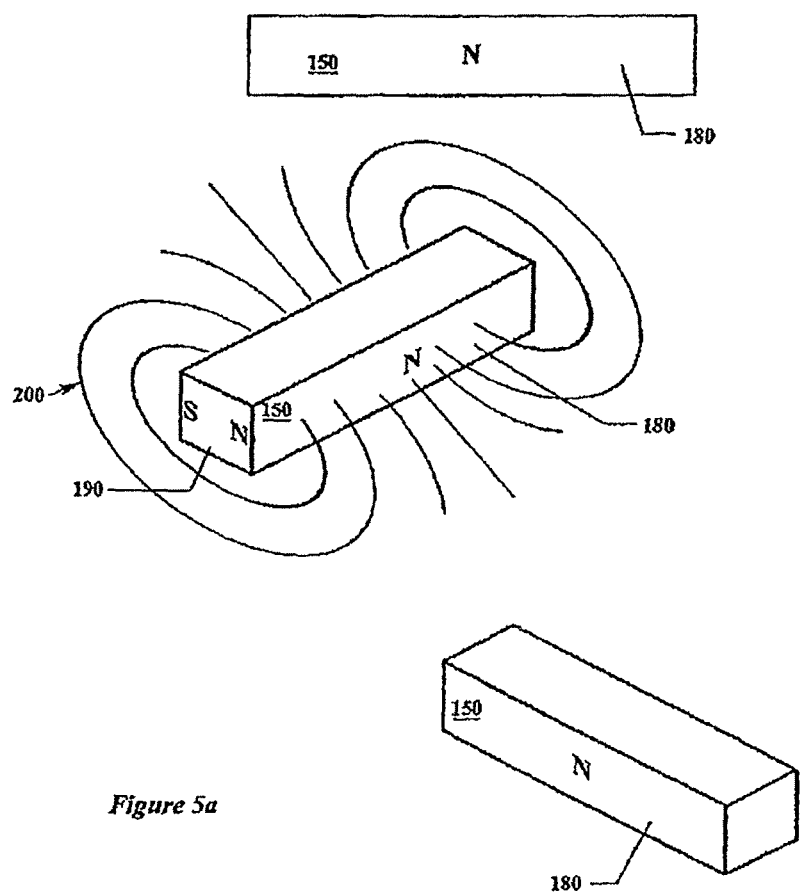
FIG. 5A includes several views illustrating one embodiment of a push magnet of the present disclosure without magnetic shielding.
Figure 5B:
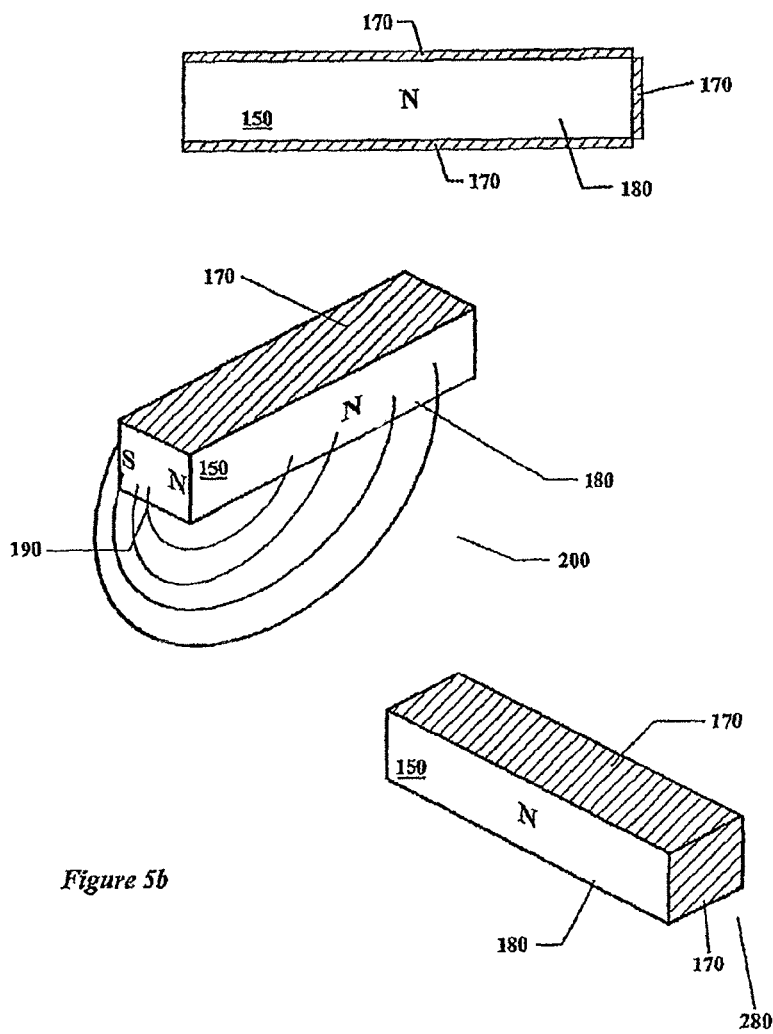
FIG. 5B includes several views illustrating one embodiment of a push magnet of the present disclosure with one configuration of magnetic shielding.

According to one embodiment of the present disclosure, as depicted in FIGS. 4 and 5B, the magnet cradle 170 covers all or part of all faces of the push magnet 150 except for the outermost face 180 and one end edge 190. Thus, the magnetic forces emanating from the exposed faces 180 and 190 are greater than the magnetic forces emanating from the unexposed faces. A magnetic field 200 created by a push magnet 150 without such shielding is depicted in FIG. 5A, whereas an example of the magnetic field 200 created in the acceleration field generator 110 with the shielding of magnet cradle 170 is depicted in FIG. 5B. With further reference to FIG. 4, end edge 190, which is exposed and not shielded, is configured to face each motion magnet 120 as it enters the acceleration field. A shielded end edge 280 of push magnet 150 opposes end edge 190 and is configured to face each motion magnet 120 as it exits the acceleration field. The outermost face 180 of the push magnet 150 closest to motion magnet 120 faces inward towards the motion magnet 120 as it passes through the acceleration field.

Magnetic shielding material is desirably material with magnetic permeability. That is, material that will allow magnetic flux lines within it. Materials with higher magnetic permeability provide better magnetic shielding than those materials with lower magnetic permeability. In one embodiment, the magnet cradle 170 is typically manufactured from steel. Alternatively, those skilled in the art will recognize that other materials may be used to create the same effect for altering the magnetic field 200.

The two push magnets 150 of a spinner assembly 135 are generally positioned on opposite sides of the spinner axle 140, as illustrated in FIGS. 3 and 4. The outermost face 180 of the push magnet 150 on one side of the spinner axle 140 generally has the opposite polarity (i.e., north) than the polarity (i.e., south) of the outermost face 180 of the push magnet 150 on the opposite side of the same spinner axle 140, as is described in more detail below with reference to the motor 100 in operation. The spinner assemblies 135 are generally situated such that there is a spatial gap 310 between them large enough for a motion magnet 120 to pass through, as seen in FIG. 3.

In a further embodiment of the magnetic propulsion motor 100, an acceleration field generator 110 may comprise a plurality of spinner axle bearings 210 fixedly attached to the main frame 400. Each spinner axle 140 may pass through at least one spinner axle bearing 210 allowing the spinner axle 140 to rotate within the axle bearing 140. A spinner axle bearing 210 may be manufactured from any material known in the art, such as plastic, aluminum, stainless steel, etc. The friction between the spinner axle 140 and the spinner axle bearing 210 is sufficiently low to facilitate rotation of the push magnet 150.

Each spinner axle 140 may include at least one belt pulley 220 arranged at an end of the spinner axle 140, as shown in FIGS. 1, 3, and 4. A belt 230 may be arranged around the belt pulley 220 of each spinner axle 140. Thus, all spinner axles 140 will rotate in unison.

A power supply 240 may further be provided to drive the rotation of the spinner axles 140. The power supply 240 may be an electric motor or any other means capable of driving the spinner axles 140. Where a belt 230 and belt pulley 220 system is employed, the power supply 240 may be used to drive the rotation of a first spinner axle 140, while the belt 230 and belt pulleys 220 will transfer the power to rotate the remaining spinner axles 140.

Figure 6:
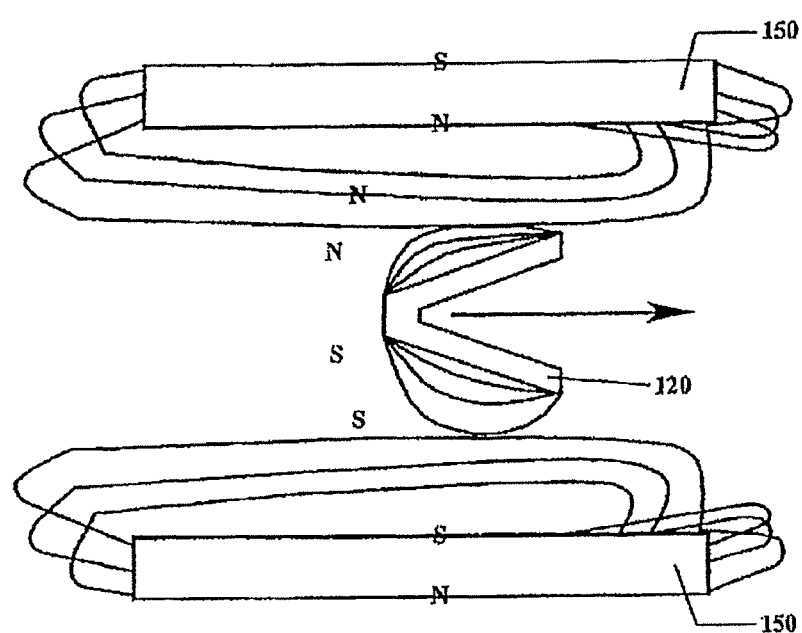
FIG. 6 is a schematic view of the magnetic fields created by one embodiment of shielded push magnets and shielded motion magnet of the present disclosure.
Figure 7A:
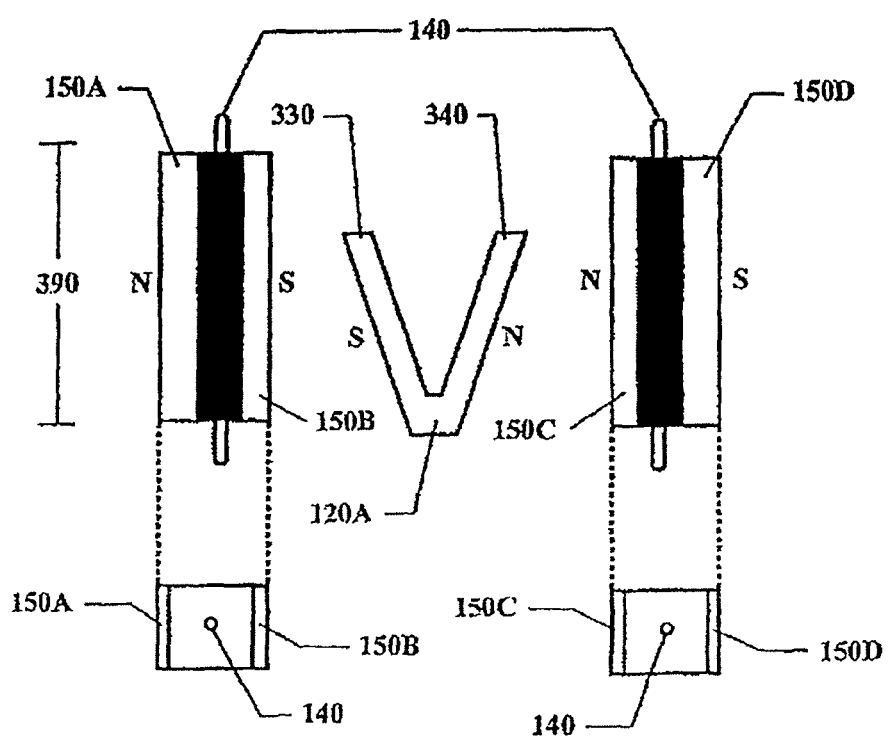
FIG. 7A is a schematic view of one stage of one embodiment of push magnets and motion magnets of the present disclosure in operation illustrating a first motion magnet in home position.

As described, an acceleration chamber 105 of the magnetic propulsion motor 100 of the present disclosure further comprises at least one motion magnet 120. The motion magnets 120 are typically neodymium rare earth magnets; however, other magnets known in the art may be used instead of the neodymium magnets. The motion magnets 120 generally have the shape of the letter "V", "U," or "A" as shown in FIGS. 6 and 7A, when viewed from the proximal end of the extension arm 380. In operation, the shape of the motion magnets 120 helps optimize the magnetic force exerted on the motion magnets 120 by the push magnets 150, as illustrated in FIG. 6. Generally, a motion magnet 120 with a "V" or "A" or similar shape, has two extensions 330 and 340, as shown in FIG. 7A, and the two extensions have opposite magnetic polarity. For example, referring to motion magnet 120A in FIG. 7A, extension 340 has a north polarity and extension 330 has a south polarity.

Figure 8:
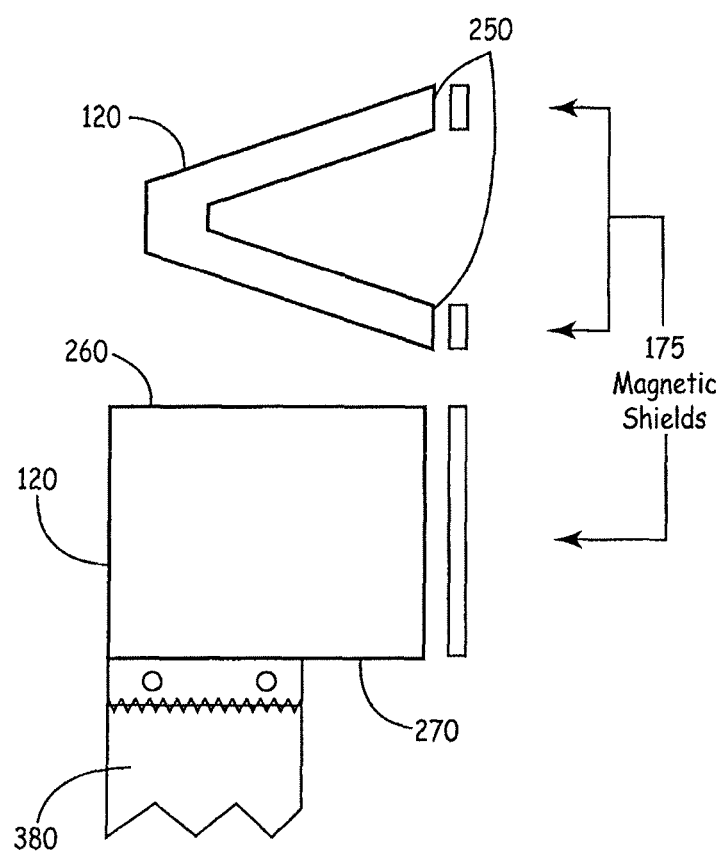
FIG. 8 is a top and side view of one embodiment of a motion magnet of the present disclosure.

Similar to the push magnets 150, the motion magnets 120 may further have magnetic shielding 175 to appropriately redirect the magnetic force emanating from desired edges. As shown in FIG. 8, according to one embodiment of the present disclosure, magnetic shielding 175 may cover all or part of the surfaces located at the end of the extensions of the motion magnet 120. Additionally, magnetic shielding 175 may be secured to the upper 260 and lower 270 edge surfaces. Magnetic shielding 175, in one embodiment, may create a magnetic field around the motion magnet 120 that will interact more efficiently with the magnetic acceleration field created by the push magnets 150. Alternatively, the magnetic shielding 175 may aid in reducing or eliminating magnetic lock by limiting the repelling force created by the push magnets 150 acting against the motion magnet 120 as the motion magnet 120 enters the acceleration field generator 110. The magnetic shielding 175 is typically manufactured from the same material as the shielding material used for manufacturing the magnetic cradles 170.

Figure 9A:
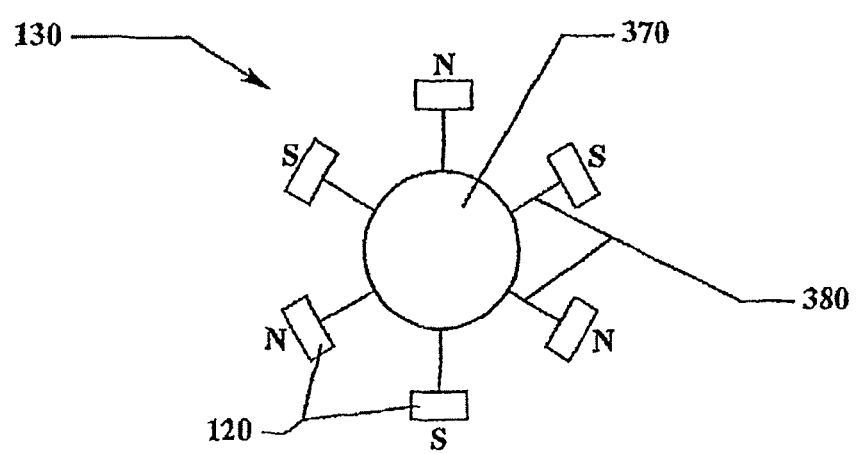
FIG. 9A is a side view of one embodiment of a rotating hub of the present disclosure.

As shown in FIG. 9A, the rotating hub 130 generally comprises a base 370 and at least one extension arm 380. The extension arm 380 connects the motion magnet 120 to the base 370. In one embodiment of the present disclosure, a chamber 105 of the magnetic propulsion motor 100 has multiple motion magnets 120, and each motion magnet 120 is fixedly coupled to base 370 of rotating hub 130 by using an extension arm 380. Thus, the number of extension arms 380 coincides with the number of motion magnets 120. In alternative embodiments, each extension arm 380 may have more than one motion magnet 120. Each extension arm 380 is attached at one end to the base 370 such that the extension arms 380 are generally equally spaced circumferentially around the base 370. This arrangement appropriately balances the hub 130. At the opposite end of each extension arm 380, a motion magnet 120 is attached such that when the extension arms 380 are rotating in a forward motion, the open end of the "V" or "A" shaped motion magnets 120 enters into the spatial gap 310 of the acceleration field generator 110 before the vertex of the motion magnets 120, thereby causing ends 250 to enter the gap 310 first. The length of the extension arms 380 may be increased or decreased depending on the specific application. In a further embodiment, a chamber 105 of the magnetic propulsion motor 100 further comprises a main axle 160 coupled with the base 370, wherein the axle 160 rotates relative to the base 370.

According to one embodiment of the present disclosure, a chamber 105 of the magnetic propulsion motor 100 is configured to operate as follows. Rotating hub 130 is aligned such that a motion magnet 120 at the distal end of each extension arm 380 will pass through the spatial gap 310 of each of the acceleration field generators 110. In one embodiment, multiple extension arms 380 rotate along with rotating hub 130. Typically, it is desirable to provide an even number of extension arms 380 and motion magnets 120 to allow for the polarity of each edge 330 and 340 of the motion magnets 120 to be alternated, as shown in FIG. 9A. Not to be limited by theory, it is believed that having motion magnets of alternating polarity allows a motion magnet to have added attractive force to help "pull" it forward, the attractive force coming from the acceleration field immediately preceding it. Not to be limited by theory, the amount of added attractive force from adjacent acceleration fields may also be affected by the distance between alternating motion magnets of opposite polarity, as discussed below. Alternatively, there may only be one extension arm 380 and motion magnet 120.

Figure 9B:
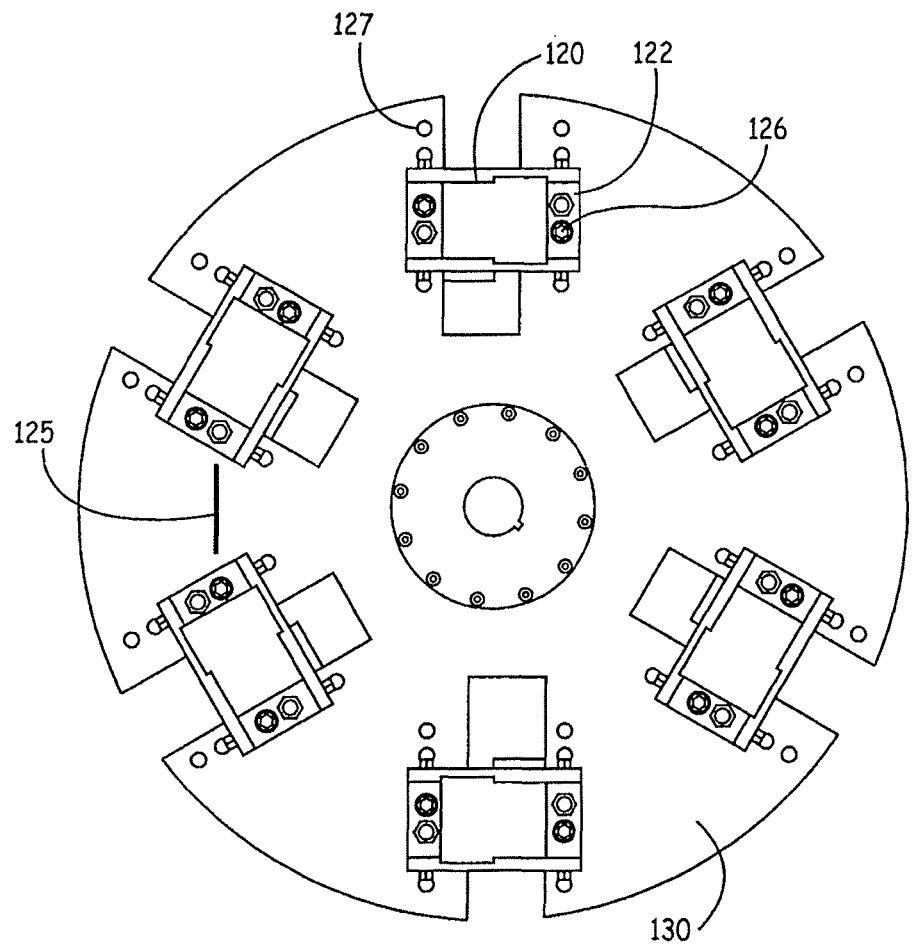
FIG. 9B is a side view of one embodiment of the present disclosure of a rotating hub with adjustable arc length between motion magnets.

An embodiment of present disclosure in which the rotation hub 130 is configured to carry one or more motion magnets 120 at adjustable distances or radii from the center of rotation hub 130 is shown in FIG. 9B. One or more motion magnets are fixedly or removably attached to motion cradles 122, which may then be adjustably attached to rotation hub 130, at various distances from the center of the hub. The one or more motion cradles 122 may be removably attached to a rotation hub 130 by any suitable means, for example, by one or more fasteners 126 attached through holes 127 in the rotation hub. As multiple motion magnets 120 are attached closer to the center of motion hub 130, the distance or arc length 125 between adjacent motion magnets 120 typically decreases. The distance or arc length 125 between motion magnets 120 may be adjusted to a distance or length that maximizes the power and/or torque output. Alternatively, by adjusting the arc length 125, power and/or torque outputs as measured by any suitable measuring device, may be adjusted, for example, to give increased power and/or torque, increased output efficiency, or provide a specific or predetermined power or torque output suitable for a particular use. Further, it is also possible to easily add or remove motion magnets 120 to affect power and/or torque output for a particular use.

Typically, each motion magnet 120 will be placed equidistant from the center of the rotating hub 130. However, the motion magnets 120 may be placed at alternating or distinctive distances from the center of the rotating hub 130 in some embodiments.

As previously described, a chamber 105 of the magnetic propulsion motor 100 shown in FIG. 1 may comprise two acceleration field generators 110, each with a set of spinner assemblies 135. Alternatively, more or fewer acceleration field generators 110 may be desirable for a particular application, and the motor shown in FIG. 1 may be modified accordingly. Generally, where more torque or power is desired, additional acceleration field generators 110 may be added. Furthermore, the acceleration field generators 110 can generally be evenly placed around the circumferential path of the motion magnets 120 and equidistant from the center of the rotating hub 130. Where two acceleration field generators 110 are used, they typically can be placed on opposite sides of the circumferential path of the motion magnets 120, as shown in FIG. 1.

In some embodiments of the present disclosure, spinner assemblies 135 and rotating hubs 130 may be configured to have a gearbox functionality, that is, to increase or decrease the gear ratio between a spinner axle 140 and main axle 160, which increases or decreases the RPM of an output main axle 160 relative to an input spinner axle 140. Since a spinner assembly 135 and rotating hub 130 in the present disclosure do not physically interlock as in conventional gearing, use of the spinner assembly 135 and rotating hub 130 can create, in effect, a nearly friction-free, highly efficient gearbox. In addition, lack of physical interlocking avoids mechanical wear to the moving parts, minimal heat generation, and has little need for lubrication. A further advantage of the motor of the present disclosure is that two or more motion magnets 120 evenly spaced around the rotating hub 130 may self-correct the rotating hub 140 into the proper orientation and speed if the rotation speeds of the spinner assembly and rotation hubs begin to run out of phase because of shock loading or unusually rapid changes in velocity of the spinner axle 140, for example. Under the same conditions, a conventional gearbox may be expected to lock, jam, or break, necessitating off-line time and repairs.

Various gear ratios, for example but not limited to 1:1, 1:2, 2:1, 1:3, or 1:4, may be created by increasing or decreasing the number of magnets on a spinner assembly 135 and/or rotating hub 130 in an acceleration chamber 105. For example, a spinner assembly 135 with the same number of push magnets 150 as motion magnets on a rotating hub 130 in an acceleration chamber 105 will typically have a 1:1 gear ratio, and the spinner assembly and rotating hub may have the same RPM. Increasing the number of motion magnets 120 on a rotating hub 130 relative to the number of push magnets 150 on a spinner assembly 135 in the same acceleration chamber 105 typically decreases the gear ratio, decreasing the RPM of an output main axle 160. For example, an acceleration chamber 105 with two push magnets 150 on a spinner assembly 135 and four motion magnets on a rotating hub 130 would have a gear ratio of 2:1, i.e., the rotating hub 140 would have one-half the RPM as the spinner assembly. Conversely, increasing the number of push magnets 150 on a spinner assembly 135 relative to the number of motion magnets 120 on a rotating hub 130 typically increases the gear ratio. For example, an acceleration chamber 105 with four push magnets 150 on a spinner assembly 135 and two motion magnets 120 on a rotating hub 130 would typically have a gear ratio of 1:2, where the rotating hub has twice the RPM of the spinner assembly. Other gear ratios may be produced with other configurations of motion magnets and push magnets.

The magnetic motor of the present invention is generally highly efficient. A minimal loss of efficiency may be caused by air drag on the spinning parts. In some embodiments, air drag may be reduced by an appropriate airfoil or operation of the motor in a vacuum or a reduced pressure atmosphere.

Figure 7B:
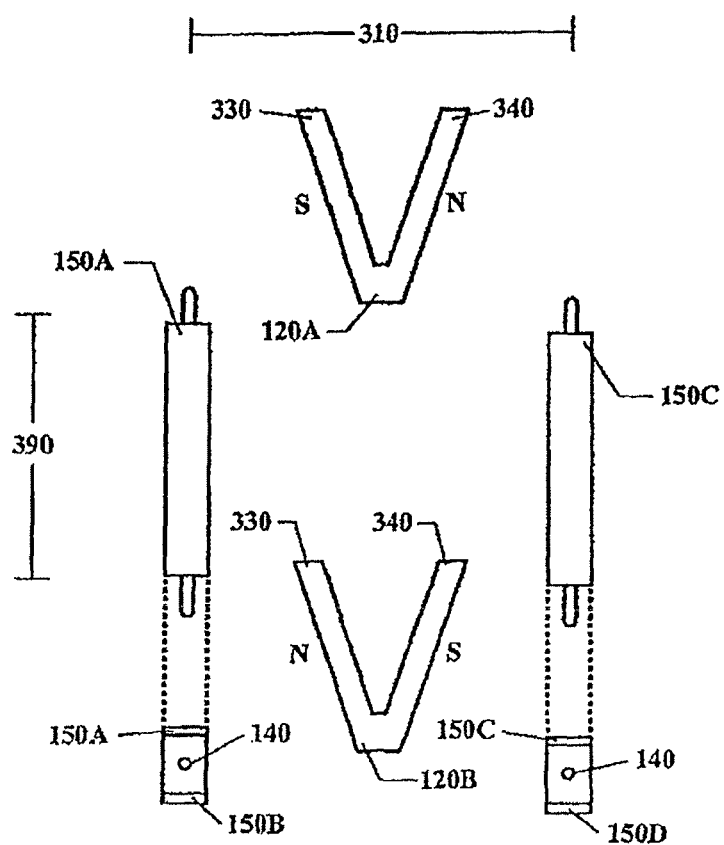
FIG. 7B is a schematic view of a second stage of one embodiment of push magnets and motion magnets of the present disclosure in operation illustrating a first motion magnet exiting the acceleration field generator and a second motion magnet entering the acceleration field generator.
Figure 7C:
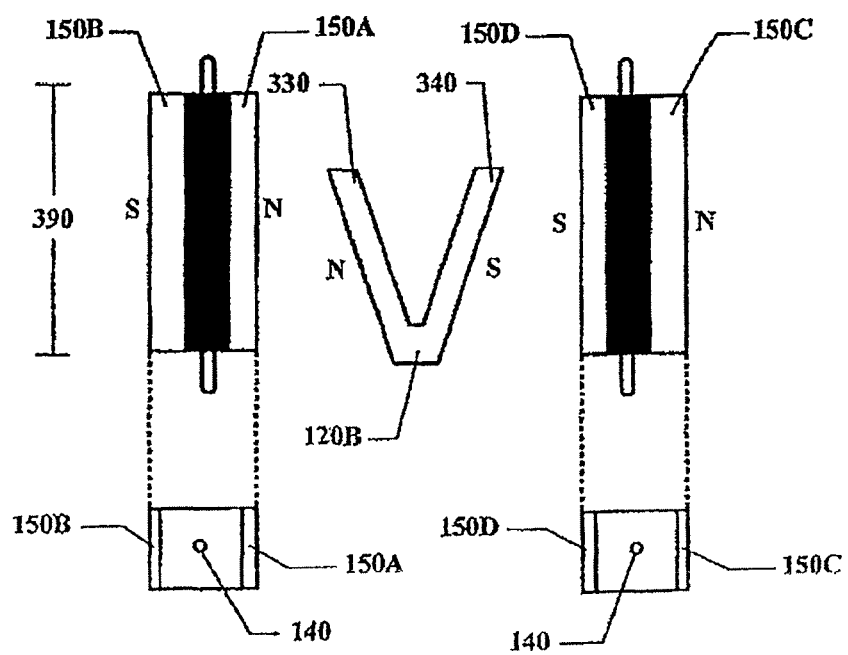
FIG. 7C is a schematic view of a third stage of one embodiment of push magnets and motion magnets of the present disclosure in operation illustrating a second motion magnet in home position.

As previously described, in one embodiment of the present disclosure, each acceleration field generator 110 comprises two spinner axles 140, each having two push magnets 150 rotatable thereabout. The outermost faces 180 of the two push magnets 150 on the same spinner axle 140 have opposite polarities. Furthermore, the acceleration field generator 110 is typically configured such that, at any given moment, the outermost face 180 of the push magnet 150 facing into the gap 310 on one of the spinner assemblies 135 has the opposite polarity of the outermost face 180 of the push magnet 150 facing into the gap 310 on the other spinner assembly 135, as shown in FIGS. 7A and 7C. Push magnets 150 are aligned in such a manner due to the edges 330 and 340 of the motion magnets 120 having opposite polarities, as previously discussed.

In embodiments where more than one extension arm 380 is provided, extension arms 380 may be ordered around the hub such that the motion magnet edges 330 and 340 alternate polarities from one motion magnet 120 to the next. For example, as illustrated in FIG. 7B, motion magnet 120A has a north polarity on edge 340 and a south polarity on edge 330, while the next subsequent motion magnet 120B has a south polarity on edge 340 and a north polarity on edge 330. This alternating pattern may be followed for all remaining motion magnets 120, which results in an even number of extension arms 380 and motion magnets 120.

In operation the push magnets 150 and the motion magnets 120 work together to create motion, torque, and power. Magnetic lock occurs in other systems when the motion magnets 120 require as much power to enter the magnetic field created by the acceleration field generator 110 as is generated leaving the magnetic field. In various embodiments of the present disclosure, the push magnets 150 are taken out of position to affect the conflicting magnetic field created by the motion magnets 120 and then brought back into the proper position at the appropriate time, thereby eliminating or mitigating magnetic lock. When push magnets 120 are removed or reintroduced into the proper position too early or too late, the motor 100 would lose torque and power. The timing of the motion of the push magnets 150 and the motion magnets 120 of the present disclosure allows for the creation of an acceleration field, and magnetic lock can be significantly reduced or bypassed.

According to one aspect of the magnetic propulsion motor 100 of the present disclosure, the timing of the positioning of the push magnets 150 in relation to the motion magnets 120 that reduces or avoids the magnetic lock is now described. The positioning of the push magnets 150 of the present disclosure will be described with reference to a spinning motion of push magnets 150. However, other motions or combination of motions creating a similar effect can be employed, such as moving, vibrating, pushing, pulling, raising and/or lowering the push magnets 150 away from the motion magnets 120 at the appropriate time. The overall effect of the motion is to bring the push magnets 150 away from the magnetic field of the acceleration field generator 110.

Referring to FIGS. 7A, 7B, 7C and 7D, the push magnets 150 have been numbered 150A, 150B, 150C and 150D for easier reference while describing the magnetic propulsion motor 100 in operation. Similarly, the motion magnets 120 that are visible in these drawings have been numbered 120A, 120B and 120C. In FIGS. 7A-D, a longitudinal view showing an acceleration chamber from above is depicted at the top of each figure, and at the bottom of each figure is a projection of an end view of each corresponding spinner assembly 135, in order to help show the orientation of the push magnets 150A-D within each spinner assembly.

Referring now to FIG. 7A, motion magnet 120A is in a "home" position. Home position represents the position at which a motion magnet 120 is approximately equidistant from the entrance and exit of the acceleration field. Typically, this point is where the motion magnet 120 is positioned generally at the midpoint of distance 390. At home position, the push magnets 150B and 150C, which are nearest the motion magnet edges 330 and 340 and are part of separate spinner assemblies 135, are generally facing one another directly.

The two directly facing push magnets 150B and 150C, thus described, have opposite polarities. For example, as shown in FIG. 7A, push magnet 150B has a south polarity while push magnet 150C has a north polarity. Additionally, as illustrated earlier, each push magnet 150B and 150C will have the same polarity as the nearest edge of the motion magnet 120A, which is at the center of the acceleration field. For example, as shown in FIG. 7A, push magnet 150B and motion magnet edge 330 both have a south polarity while push magnet 150C and motion magnet edge 340 both have a north polarity. This creates the repelling force to accelerate the motion magnet 120A through the acceleration field. The field created in gap 310 may also create an attracting force to pull in the next subsequent motion magnet 120B, as shown in FIG. 7B. In some embodiments, the rotating hub acts as a flywheel, and inertial forces may help to move, or may be the predominant force moving the next subsequent motion magnet 120B into the acceleration field. These forces cause rotating hub 130, and therefore motion magnets 120, to rotate about main axle 160.

Meanwhile, as belt 230 causes belt pulley 220 to rotate each spinner axle 140 in unison, push magnets 150A and 150C rotate to an "upward" position and push magnets 150B and 150D rotate to a "downward" position, as seen in FIG. 7B. Additionally, motion magnet 120A exits the acceleration field generator 110 and magnet 120B enters the acceleration field generator 110. During this motion, the spinner assemblies 135 continue to rotate such that the push magnets 150 are equidistant from the center of gap 310, as illustrated in FIG. 7B. This is generally the same position that the spinner assemblies 135 are in as the next approaching motion magnet 120B nears the entrance to the acceleration field generator 110.

Referring now to FIG. 7C, as motion magnet 120B is nearing the entrance to the acceleration field generator 110, push magnets 150A and 150D continue to rotate relative to the spinner axles 140 such that they will be approaching a position where they will be directly facing one another. When motion magnet 120B enters into this second "home" position as shown in FIG. 7C, push magnets 150A and 150D will generally be directly facing one another. As previously illustrated, when motion magnet 120B is in home position, push magnet 150A and motion magnet edge 330 both have the same polarity, i.e., north, while push magnet 150D and motion magnet edge 340 similarly have the same polarity, i.e., south. As described earlier, this creates both the repelling force to expel motion magnet 120B from the acceleration field and attract motion magnet 120C into the acceleration field. The inertia of the spinning rotation hub 130 may also help to move motion magnet 120C into position. One illustration of the magnetic field lines created in one embodiment of the present disclosure wherein a motion magnet 120 is in substantially the home position is depicted in FIG. 6.

Figure 7D:
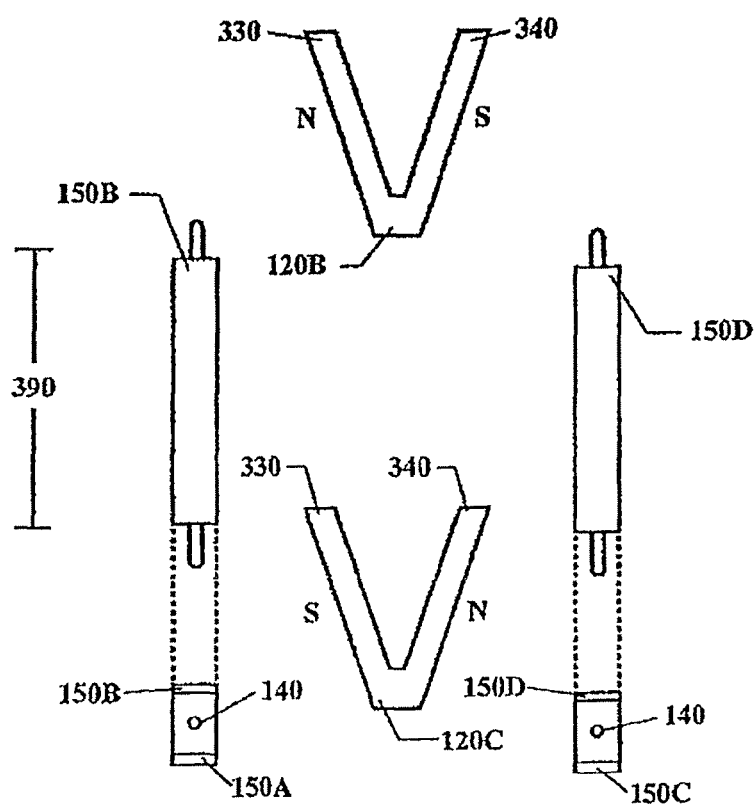
FIG. 7D is a schematic view of a fourth stage of one embodiment of push magnets and motion magnets of the present disclosure in operation illustrating a second motion magnet exiting the acceleration field generator and a third motion magnet entering the acceleration field generator.

While motion magnet 120B is exiting the acceleration field generator 110, the spinner assemblies 135 will generally be rotating such that the push magnets 150 are equidistant from the center of gap 310, as illustrated in FIG. 7D. This is generally the same position that the spinner assemblies 135 are in as the next approaching motion magnet 120C, having similar characteristics as motion magnet 120A, nears the entrance to the acceleration field generator 110. Alternatively, motion magnet 120C could be motion magnet 120A rotating through the acceleration field generator 110 once again.

The timing of the position of the push magnets 150 and motion magnets 120, thus described, provides for at least two resulting effects. First, an exiting motion magnet, e.g., motion magnet 120A, will be pushed away from the acceleration field, while the next subsequent motion magnet, e.g., motion magnet 120B, which is entering the acceleration field, will be attracted towards the acceleration field. Second, the push/pull effect, thus described, extends the duration of the torque resulting from the rotation of the hub 130. This duration lasts for approximately the time during which a motion magnet 120 passes along the length of a push magnet 150. Each motion magnet 120 passing through an acceleration field generator 110 will feel both an attracting force entering the field and a repelling force exiting the field. This dual action can, in a sense, double the duration that a motion magnet 120 is being acted on by magnetic forces. Whereas employing solely a push technique or a pull technique would result in a shorter, staccato-like duration. Furthermore, as previously mentioned, the push/pull effect reduces magnetic lock or backlash effect. Backlash happens where the forces of the push magnets 150 want to reverse the forward motion of the motion magnets 120. Backlash is avoided in various embodiments of the present disclosure, because a motion magnet 120 that is approaching an acceleration field generator 110 is attracted toward the generator 110 and then repelled out.

In general, for various embodiments of the present disclosure, an acceleration field generator 110 may alter the magnetic acceleration field within the generator 110 to significantly reduce the repulsive force acting on the motion magnet as the motion magnet enters the acceleration field and increase the repulsive force acting on the motion magnet once the motion magnet has entered the acceleration field. Thus, backlash forces may be significantly reduced compared to the push or propulsive forces acting on the motion magnet, thus generating motion, torque and/or power. As shown above for one embodiment of the present disclosure, the alteration of the acceleration field within the acceleration field generator 110 may be accomplished by rotation of the push/drive magnet in and out of proximity to the motion magnet. Other movements of the push/drive magnets, such as moving the push/drive magnets in and out of position on oscillating aims, are within the scope of the present disclosure.

Figure 10:
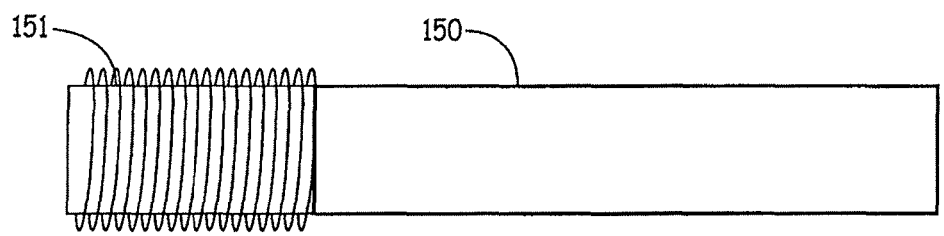
FIG. 10 is schematic view of one embodiment of a push magnet coupled to an electromagnet of the present disclosure.

In another embodiment of the motor of the present disclosure, an electromagnet 151 may be coupled to or positioned near a stationary push magnet 150, as shown in FIG. 10. Instead of moving the push magnet to alter the acceleration field, the acceleration field may be altered by using an electromagnet to alter the magnetic field of the push magnet. While FIG. 10 depicts a example embodiment where the electromagnet 151 is coupled to the proximal end of the push magnet 150 (proximal to the entrance of the acceleration field), other locations for the electromagnet are possible, for example, but not limited to, an electromagnet coupled to or positioned near the distal end of the push magnet 150 or at any other place near the push magnet 150. When electrical current flows through electromagnet 151, the magnetic field of electromagnet 151 may alter the magnetic field of push magnet 150. Typically, the flow of current into electromagnet 151 can be timed such that current flows through the electromagnet 151 and alters the magnetic field of push magnet 150 when a motion magnet 120 is approaching the acceleration field. The alteration of the magnetic field of push magnet 150 may reduce the repulsion between the push magnet and motion magnet 120, allowing the motion magnet to enter the acceleration field. Typically, the current to electromagnet 151 is turned off when motion magnet 120 has entered the acceleration field, allowing the repulsive force of push magnet 150 to reestablish itself and repel motion magnet out of the acceleration field. Similarly, the flow of electrical current to electromagnet 151 may be turned on and off by any suitable device.

Other methods of regulating the acceleration field using an electromagnet and a push magnet are possible. For example, electromagnet 151 may be normally always 'on' during operation of the motor 100, but the amount of current may be increased or decreased to alter the strength of the magnetic field of electromagnet 151 and the extent to which electromagnet 151 alters the magnetic field of push magnet 150. Further, it is recognized that other appropriate times for energizing the electromagnet may facilitate a motion magnet 120 entering and exiting an acceleration field. Further yet, in some embodiments, the electromagnet may be turned "on" once the motion magnet has entered an acceleration field to increase the repulsive force causing the motion magnet to leave the acceleration field.

In another embodiment of the present disclosure, the push magnet may be an electromagnet. The electromagnet may be coupled to a device that may reduce or shut off the flow of electrical current to an electromagnet as a motion magnet approaches the acceleration field, and turns on or increases the current significantly reducing or eliminating backlash against the motion magnet.

Accordingly, reducing the repulsive force of the drive/push magnets at the appropriate time, whether by moving the drive magnets out of the acceleration field, applying techniques of electromagnetism, and/or other methods opens a "window" for a motion magnet to enter an acceleration field by reducing the repulsive force acting against it. Similarly, increasing the repulsive force at the appropriate time, either by moving the push magnets into the acceleration field, or creating or reestablishing a repulsive force by techniques of electromagnetism and/or by other methods after the motion magnet has entered the acceleration field closes the "window," propelling the motion magnet out of the acceleration field.

Various embodiments of the magnetic propulsion motor 100 create energy without pollution. The motors 100 of the present disclosure can be used to replace any constant RPM motor, such as pumps, electric motors, generators or compressors. There are no size limitations or restrictions inhibiting the use of the magnetic propulsion motor 100 of the present disclosure. Furthermore, the motor 100 may be used as a gearbox to increase or decrease input RPM, and or increase or decrease power and/or torque, depending on the configuration of the motor 100.

In the above embodiments, the input spinner axles 140 are generally at right angles to the output main axle 160, thus the output force is substantially at a 90° or perpendicular direction relative to the input force. See, e.g., FIG. 1. In some situations, however, it can be advantageous or desirable for the input drive axle and output axle to be in the same direction, i.e., parallel to each other.

Figure 11:
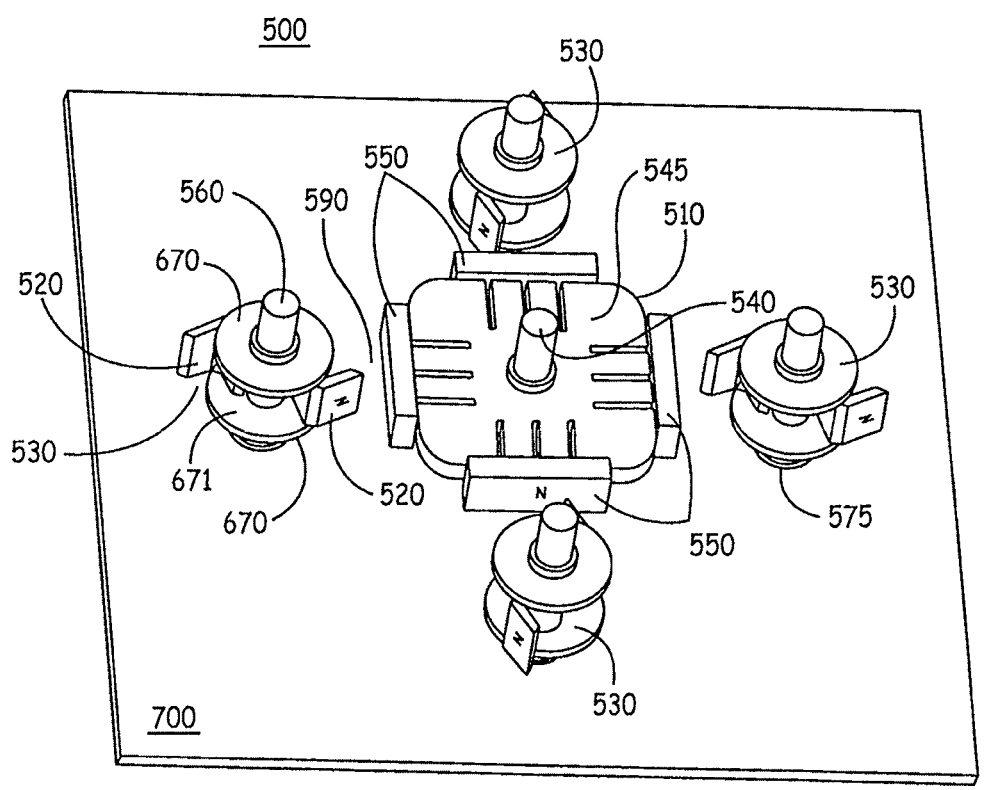
FIG. 11 is a side view of one embodiment of a parallel magnetic propulsion motor of the present disclosure with multiple motion hubs around a single drive hub.

In that respect, FIG. 11 depicts another embodiment of the present disclosure, where a magnetic propulsion motor 500 contains at least one motion magnet 520 coupled to a motion hub 530. A motion hub 530 may be rotationally coupled to a motion axle 560. A motion hub 530 may comprise at least one attachment base 670, which projects laterally from the motion axle 560 and may be a point of attachment for one or more motion magnets 520, thus securing the motion magnets 520 in the proper orientation. In this example embodiment, a motion magnet 520 may be attached to the inner surfaces 671 of two attachment bases 670 at one or more points on the upper and lower edge surfaces of the motion magnet 520. Various other methods of securing the motion magnets 520 in the proper orientation are possible, for example, attachment of motion magnets directly to the motion axle 560, or attachment of motion magnets to one or more extension arms that are attached to one or more attachment bases 670 or directly to the motion axle 560.

The rotation of the rotating motion hub causes each motion magnet 520 to pass through a magnetic acceleration field 590 created by an acceleration field generator 510. An acceleration field generator 510 contains a drive axle 540, and a rotating drive hub 545 rotatably coupled to the drive axle 540, and at least one drive or "push" magnet 550, which may be typically located along and attached to the outer circumference of the drive hub 545. In this example embodiment, the drive magnets 550 are attached directly to the drive hub 545, but various other methods of attachment of the magnets 550 to the drive hub 545 are possible, such as securing drive magnets 550 into magnet cradles attached to a drive hub 545. The drive magnets 550 are thus secured to the drive hub 545 in an orientation suitable to create one or more acceleration fields 590. Other methods of securing drive magnets 550 in the proper orientation are possible, such as securing the drive magnets 550 to one or more extension arms, for example.

Output motion axles 560 and input drive axle 540 are generally parallel to each other. Drive hub 545 generally rotates in the same rotation plane as motion hub 530. The motion hub 530 and drive hub 545 may be held in close proximity through spaced motion axle bearings 575 and drive axle bearings that hold the motion axle 560 and drive axle 540, respectively, in place while allowing them to each spin freely. The bearings 575 may be held in a frame 700. The frame can be substantially solid as depicted here, or in any configuration that allows drive axle 540 and motion axles 560 to rotate freely in position and from one another.

The rotation of motion hub 530 causes motion magnet 520 to pass through an acceleration field 590 created by the interaction of the motion magnet 520 and drive magnets 550. Each motion hub 530 may have one or more motion magnets 520 attached thereto, and each drive hub 545 may have one or more drive magnets 550 attached thereto. In one embodiment, the motion hub 530 and drive hub 545 may rotate in opposite directions, causing each motion magnet 520 and drive magnet 550 to rotate in opposite directions past each other as they are brought into proximity during a portion of their respective rotational paths.

In certain embodiments, the parallel magnetic propulsion motor 500 may have multiple rotating motion hubs 530 spaced around a single magnetic drive hub 545 in the same rotation plane, as shown in FIG. 11. Multiple motion hubs 530 may be spaced equidistantly around a drive hub 545 or in any other suitable configuration. Motion hubs 530 may be coupled individually to separate motion axles 560.

In the example embodiment shown in FIG. 11, four motion hubs 530 are spaced equidistantly about the perimeter of a single drive hub 545. Two motion magnets 520 are attached to each of the four motion hubs 530. Four drive magnets 550 are attached to the drive hub 545. This configuration allows for approximately a four-fold increase in overall power output over a single motion hub/drive hub configuration (with the same amount of magnets per drive and motion hub, and the same size drive and motion hub) with little loss in efficiency. In the configuration shown, four motion magnets 520 enter acceleration fields 590 created by the four drive magnets 550 on the drive hub 545 substantially simultaneously.

Figure 12:
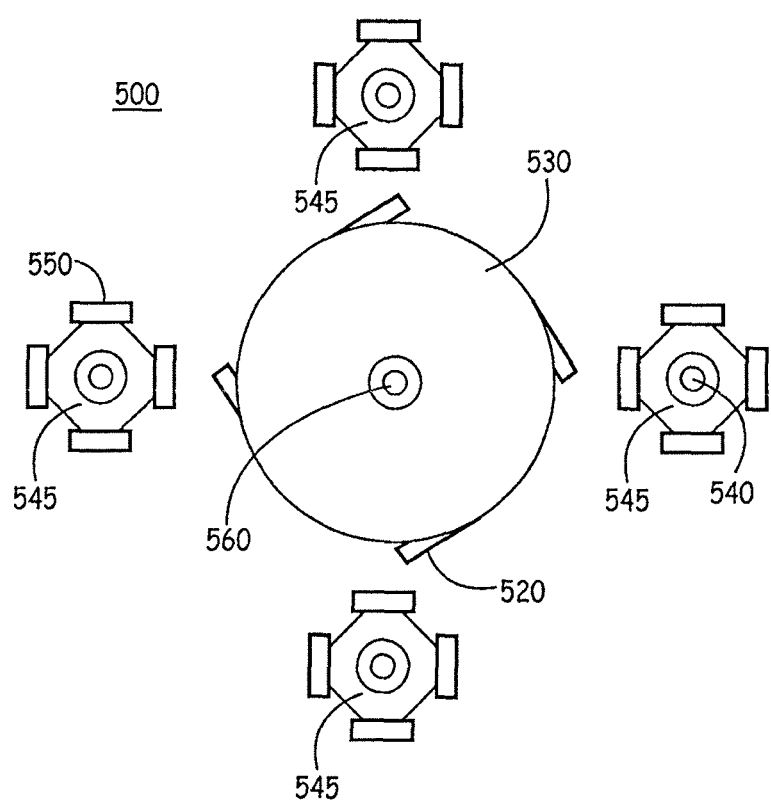
FIG. 12 is a schematic view of one embodiment of a parallel magnetic propulsion motor of the present disclosure with a multiple drive hubs around a single rotating hub.

In other embodiments of a magnetic propulsion motor 500, multiple drive hubs 545 may be spaced around a single motion hub 530 in the same rotation plane, as shown in FIG. 12. Multiple drive hubs 545 may be spaced equidistantly around a motion hub 530 or in any other suitable configuration. In the example embodiment shown in FIG. 12, four drive hubs 545 are equally spaced around the perimeter of a single motion hub 530, but other suitable numbers of drive hubs and/or spacing configurations of drive hubs around motion hub 530 are possible. In the embodiment shown, the motion magnets 520 on the motion hub 530 each rotate through an acceleration field 590 substantially at the same time. Thus, the torque and power output of a single motion axle 560 can be significantly increased. The multiple drive axles 540 may be each powered by individual power sources, or more than one of the multiple drive axles 540 may be powered by a single power source. In such an embodiment, more than one drive axle 540 may be coupled together by belts or the like so that they may be rotated by a single power source.

It is recognized that various arrangements of one, two or multiple motion hubs and one, two or multiple magnetic drive hubs in the same rotation plane are possible. For example, with regard to the example embodiment of FIG. 11, the number of motion hubs 530 could be more or less than four, and the number of drive hubs 545 could be more or less than four.

Figure 13:
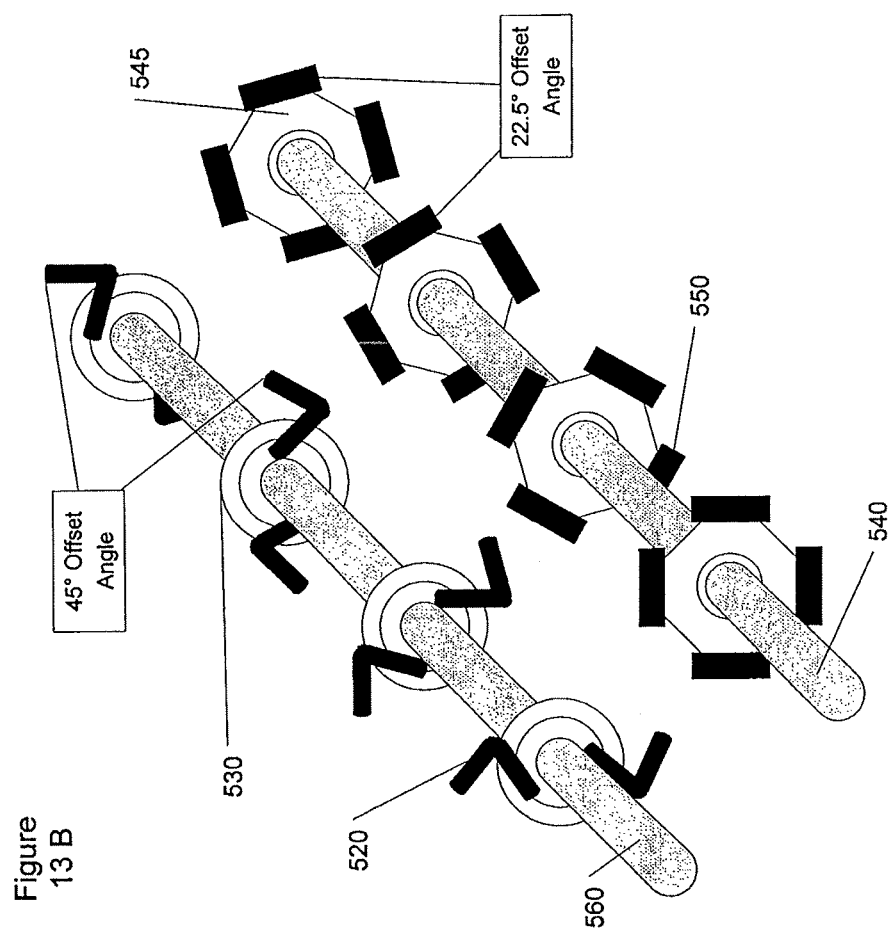
FIG. 13A is a schematic view of multiple drive hubs and rotating hubs wherein motion and drive magnets are in the same orientation along their respective drive and motion axes.
FIG. 13B is a schematic view of multiple drive hubs and rotating hubs wherein the motion and drive magnets are in an offset or helical orientation along their respective drive and motion axes.

In another embodiment of the motor of the present disclosure, shown in FIG. 13A, power and/or torque may be increased by adding motion hubs axially along a motion axle 560, such that multiple motion hubs may be present per motion axle, and rotate in generally parallel rotation planes to one another. In the example embodiment shown in FIG. 13A, four motion hubs 530 are located axially along motion axle 560. However, any appropriate amount of motion axle 560 output power and/or torque can be achieved by placing one, two or multiple motion hubs on the motion axle. Typically, each motion hub 530 on a motion axle 560 rotates in the same rotation plane as one or more drive hubs 545.

Typically, one or more motion magnets 520 may be attached to each motion hub 530. Where more than one motion hub 530 is attached to a motion axle 560, the alignment of motion magnets 520 on each attached motion hub 530 may be the same or different as the alignment of the motion magnets on one or more of the other motion hubs attached to the same motion axle. In the embodiment shown in FIG. 13A, motion magnets 520 on each motion hub 530 share substantially the same alignment as motion magnets on the other motion hubs of motion axle 560. In the embodiment illustrated in FIG. 13B, however, the alignment of motion magnets 520 on each motion hub 530 is different from the motion magnets on at least one other motion hub of motion axle 560.

Generally, where motion magnets 520 on two or more motion hubs 530 attached to same motion axle 560 share the same alignment, two or more motion magnets on the shared-alignment motion hubs will enter into acceleration fields at the same time. In other words, the shared-alignment motion hubs have a "synchronous" alignment. Where alignments of motion magnets 520 vary between two or more motion hubs 530 attached to the same motion axle 560, motion magnets on the varying-alignment or "offset"-alignment motion hubs can be configured so they generally do not enter acceleration fields at the same time. In this way, the number of motion magnets 520 in acceleration fields and the timing of entry into acceleration fields on a motion axle 560 at any one time may be adjusted to affect power and/or torque output, as described more fully below.

As stated above, FIG. 13A illustrates a synchronous alignment embodiment of the present disclosure. Multiple motion hubs 530 may be orientated on a motion axle 560 such that two or more or all of the motion hubs 530 rotate a motion magnet 520 into an acceleration field 590 at substantially the same time. Typically, drive hubs 545 and drive magnets 550 are arranged in a corresponding alignment to the motion hubs 530 and motion magnets 520, so that the multiple synchronous acceleration fields may be created. In the example synchronous alignment embodiment shown in FIG. 13A, two motion magnets 520 are equally spaced around the perimeter of each motion hub 530, and four drive magnets 550 are equally spaced around each of four corresponding drive hubs 545, although any suitable number of hubs, magnets per hubs, and magnet spacing configurations are possible.

Power and/or torque output of the motion axle 560 may have one or more output(s) 'peaks,' the peak outputs occurring where motion magnets 520 on successive motion hubs 530 synchronously exit acceleration fields. Power and/or torque output may be lower in the intervals between the times when motion magnets 520 are exiting acceleration fields.

FIG. 13B illustrates an example embodiment of varying, "offset" alignments, which may give a more constant output of torque and/or power. In offset alignment embodiments, the motion hubs 530 on the same motion axle 560 may be offset at one or more offset angles from one another, such that motion magnets 520 of one motion hub exit an acceleration field at different times than motion magnets 520 of another motion hub. This staggers the times at which motion magnets on the same motion axle 560 exit acceleration fields, imparting a more constant torque and/or power to the motion axle 560.

In some offset alignment embodiments, the alignment of one or more of a plurality of motion hubs 530 on the same motion axle 560 may be configured such that no motion magnets of any of the one or more motion hubs 530 enter acceleration fields in synchrony with each other. In other offset alignment embodiments, motion magnets 520 on one motion hub 530 may enter acceleration fields in synchrony with one or more of the motion magnets 520 on another motion hub 530 on the same motion axle 560, but be offset from one or more of the motion magnets 520 on yet another motion hub 530 on the same motion axle.

The particular offset alignment of motion hubs 530 attached to the same motion axle may be characterized by the alignment's "offset angles," that is, the degree of offset between corresponding motion magnets 520 on adjacent motion hubs 530. The offset angle between adjacent motion hubs may or may not be the same between all adjacent motion hubs 530 on a motion axle 560. The offset alignment of drive magnets 550 on adjacent drive hubs 545 on a drive axle 540 may also be characterized by its offset angles.

Typically, drive magnets 550 on one or more drive hubs 545 can be arranged in a offset alignment on a drive axle 540 such that efficient and effective acceleration fields may be created with the corresponding motion magnets 520 on a motion hub 530.

In some embodiments, the offset angle between adjacent drive hubs 545 on the same drive axle 540 may be the offset angle between the corresponding motion hubs on the motion axle 560, adjusted by a multiplier or other variable which is dependent on the gear ratio between the corresponding motion hubs 530 and drive hubs 545. For example, where a gear ratio between a corresponding drive hub and motion hub is denoted as d:m, then a typical multiplier for the offset angle, $D°$, for adjacent drive hubs on the drive axle may, in one example method, be approximated by $D°=M° (d/m)$, where $M°$ is the offset angle between corresponding adjacent motion hubs on the motion axle. Conversely, $M°=D° (m/d)$ can be used to approximate a typical multiplier for the offset angle, $M°$, for adjacent motion hubs on the motion axle with respect to a known offset for corresponding adjacent drive hubs on the drive axle. For example, in the embodiment shown in FIG. 13B, the gear ratio is 1:2, i.e., four drive magnets 550 are attached to each drive hub 545, and two motion magnets 520 attached to each corresponding motion hub 530. The offset angle between adjacent drive hubs 545 is about 22.5°, and thus the offset angle between adjacent motion hubs 530 is about 45°. In the example embodiment FIG. 13B, all of the offset angles between adjacent drive hubs are the same, as well as all of the offset angles between adjacent motion hubs. However, it is recognized that, in some embodiments, not all offset angles between hubs on the motion or drive axles will be the same.

In the example offset alignment embodiment illustrated in FIG. 13B, the offset angle between corresponding motion magnets 520 is about 45° in this example, but other suitable offset angles are possible. In a "helical" offset orientation, as is shown in FIG. 13B, each successive motion hub 530 is offset by the same offset angle in the same direction from the previous motion hub 530 on the motion axle 560, but other suitable alignments are possible, including but not limited to randomized offsetting, whereby each successive motion hub 530 may be offset from the previous motion hub by any offset, irrespective of the offset between any other two motion hubs along the same motion axle.

Offset alignments can give a more constant torque output than a completely synchronous alignment embodiment, such as that shown in FIG. 13A. Similarly, offset alignments where none of the motion hubs have the same alignment, may give a more constant torque than offset, "partially synchronous alignments," where some of the motion hubs have the same alignment.

In some embodiments, multiple motion axles 560, with one, two or multiple motion hubs 530 positioned axially along the motion axles 560, may be added around the perimeter of a drive axle 540, which may have multiple drive hubs 545 attached thereto. In other embodiments, one or more drive axles 540, with one, two or multiple drive hubs 545 positioned axially along the drive axles 540 may be positioned around one or more multiple motion axles 560 with one, two or multiple motion hubs 530 attached thereto.

The system dynamics of example embodiments of the synchronous and helical orientations of rotating hubs 130 were modeled in the right-angle motor of the present disclosure, described in detail above, to determine the output torque as a function of angular shaft positions of both input drive axle 140 and output main axle 160 for various orientations, with a 3:1 gear ratio reduction, wherein six motion magnets 120 on a rotation hub 130 were paired with two push magnets 150 on a spinner assembly 135. Motion magnets 120 had alternating polarities around the perimeter of the rotating hub 130. This characteristic equation is:

$$T(\theta_{in}, \theta_{out}) = A_{Config} \sin\left(\frac{\pi}{60}\theta_{out} - \frac{\pi}{2}\right)\sin\left(\frac{\pi}{180}\theta_{in}\right). \quad \text{Eq. 1}$$

This characteristic equation can be used to simulate numerous configurations of motors of the present disclosure, observing behavior such as torque fluctuations, maximum torque loading and so forth. Also, the equation may be able to estimate the torque capacity for any configuration without physically building the configuration. The equation may be able to model the effects of adding additional acceleration fields, having different gear ratios, the effects of "helical" offset orientations, and the effects of various sizes of magnets. This is all achieved by changing the parameter $A_{Config}$ based on the number of acceleration fields or other physical parameters of the system. The frequencies of the sine wave torque output in the model are dependent on the gear ratios. Phase shifts can be altered to simulate a helical orientation.

Based on physical experiments with a 3:1 gear ratio embodiment of the motor of the present disclosure, it was determined that the effect of torque 'peaks' in synchronous or single rotating hub per main axle embodiments at high torque loads and/or input speeds from the spinner assembly 135 was sufficiently small and thus negligible. Thus removing the effect of torque peaks:

$$\omega_{in} = 3\omega_{out}$$

$$\theta_{in} = 3\theta_{out} + \phi \quad \text{Eq. 2 \& 3}$$

where $\phi$ is the phase shift between input and output axles. By substituting Equation 3 into Equation 1, we find that the torque is then a sinusoidal function of the output angular position and the phase shift. It can then be seen that varying amounts of torque are available for varying the phase shift. By determining at which phase shift the highest torque is available, the torque capacity may be determined.

Exceeding that torque may result in a phase shift in which the available torque is less than the load and the angular velocity of the output shaft falls resulting in de-synchronization. For systems without a helix, this critical phase shift is 270° and by using Equation 3, this may indicate that just before desynchronization, an opposite pole motion magnet 120 is directly in the acceleration field as the drive magnet 150 enters the acceleration zone. As described above, the motion magnet 120 here may slightly lead the push magnet 150 into the acceleration field thus resulting in a high repulsion force in the direction of motion. If the phase shift were slightly greater, then the opposite-poled motion magnet 120 would slightly lag the push magnet 150 resulting in a high repulsive force against motion thus inducing desynchronization.

In order to determine the load capacity for a given configuration quantitatively the work done by and on the rotation hub/output main axle 130, 160 for a single rotation may be modeled as:

$$U = \int_0^{2\pi} T(\theta)d\theta. \quad \text{Eq. 4}$$

Because the load capacity is being modeled, it may be assumed that the gear ratio is constant and the phase shift is 270° as we modeled above, and thus $T(\theta)$ is known. Assuming that the load torque is constant then:

$$U_o = 2\pi T_{capacity}. \quad \text{Eq. 5}$$

Assuming operation at constant angular velocity (i.e., $\ddot{\theta}=0$), then the load capacity is:

$$T_{capacity} = \frac{1}{2\pi}\int_0^{2\pi} T(\theta_{out}, \phi_{critical})d\theta \quad \text{Eq. 6}$$

where $T(\theta_{out}, \phi_{critical})$ is the aforementioned modified characteristic equation for any system configuration. This capacity may be a slight over-estimation, due to not accounting for losses from friction and air resistance, but also assumptions of constant flywheel velocity.

In actual practice, there may be a slight velocity (and thus an acceleration) sinusoidal fluctuation of the high-inertia rotating hub/main output axle 130, 160. As mentioned previously, reduction of torque 'peaks' or fluctuations can be minimized by helixing. When the system is helixed the torque generated (using Eq. 1, 2, & 3) may have a slightly lower average torque in comparison to a non-helixed average torque, but also a lower amplitude. Unlike a non-helixed system, throughout the revolution at no point is the generated torque zero. If we consider:

$$T_o = T_i(\theta_{out}) - I\ddot{\theta}(\theta_{out}) \quad \text{Eq. 7}$$

where $T_i(\theta_{out})$ and $\ddot{\theta}(\theta_{out})$ are both sinusoidal functions dependent on angular position, as the control, non-helixed system and:

$$A \cdot T_o = B \cdot T_i(\theta_{out}) - C \cdot I\ddot{\theta}(\theta_{out}) \quad \text{Eq. 8}$$

as the helixed system where B<1 and C<1 for some cases, then A>1, thus resulting in slightly higher torque output. Therefore, where the helix design may be able to reduce the original acceleration fluctuation by a factor of $$\frac{T_o - B \cdot |T_i|}{I|\ddot{\theta}|} \qquad \text{Eq. 9}$$

or greater then the torque capacity can thus be raised above its original level even if B<1. This results in smoother operation (reduced torque "peaks" or fluctuations) and higher torque capacity in the same space and weight.

Figure 14:
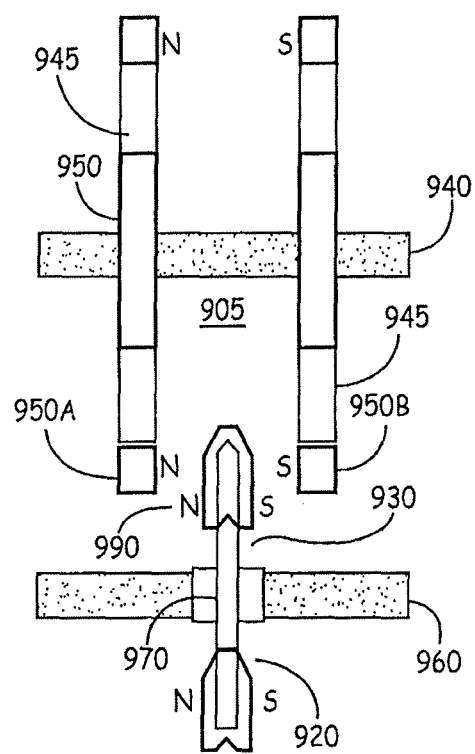
FIG. 14 is a schematic view of one embodiment of the present disclosure in which the motion magnets are laterally adjacent to the drive hub.

As shown in FIG. 14, in alternate embodiments of the parallel magnetic motor of the present disclosure, an acceleration chamber 905 may be created by two parallel drive hubs 945 rotating laterally adjacent to and flanking a parallel motion hub 930, such that the motion hub 930 rotates in a rotation plane between and parallel to the rotation planes of the two drive hubs 945. However, an acceleration chamber 905 may also be formed with one drive hub 945 flanking a parallel motion hub 930 in some embodiments. This arrangement of the hubs differs from parallel magnetic motor embodiments described above where the corresponding drive hub 545 and motion hub 530 rotate in the same rotation plane.

Returning to the example embodiment shown in FIG. 14, drive magnets 950A and 950B may be attached to flanking drive hubs 945. Drive magnets 950A and 950B may be attached to drive hubs 945 such that they face inward into acceleration chamber 905, in order to interact with motion magnets 920 attached to motion hub 930, which is located within the acceleration chamber 905. For example, as shown in FIG. 14, the north face of drive magnet 950A, and the south face of drive magnet 950B both face inward into the acceleration chamber 905. More than one drive magnet 950 may be attached to each drive hub 945, with similar orientations and properties as described in detail for drive magnets 950A and 950B. Flanking drive hubs 945 may be rotatably coupled to drive axle 940. Flanking drive hubs 945 may be rotatably coupled to the same drive axle 940, as shown in FIG. 14, but other configurations are possible, including attaching flanking drive hubs 945 to different drive axles 940. A drive magnet 950 may have magnetic shielding over one or more sides of the drive magnet. The positioning of magnetic shielding on the drive magnet 950 may be substantially identical to the magnetic shielding on push or drive magnets (e.g., 150, 450) described in detail above.

One or more motion magnets 920 may be attached to motion hub 930, which is rotatably attached to motion axle 960. In general, the orientation of motion magnets 920 on motion hub 930 is substantially similar to the right-angled embodiments described more fully above and shown, for example, in FIGS. 1 and 4. Motion magnets 920 may be generally "U", "V," or "A" shaped. One or more motion magnets 920 may be held in the proper orientation by attachment to the outer edge of an attachment base 970. Other methods of securing motion magnets 920 are possible, such as attachment to extension arms attached to the attachment base 970 or directly to motion axle 960. A motion magnet 920 may have magnetic shielding over one or more sides of the motion magnet. The positioning of magnetic shielding on the drive magnet 920 may be substantially identical to the magnetic shielding of drive magnets (e.g., 120, 420) as was described in detail above.

One or both arms of motion magnets 920 are oriented in close proximity to the rotational path of inward-facing drive magnets 950 attached to drive hubs 945 in order to form one or more acceleration fields 990. For example, as shown in FIG. 14, a motion magnet 920 may have two arms with opposite polarities, north and south. Drive magnet 950A has an inward-facing side with a north polarity that may interact with an arm of the motion magnet 920 to form an acceleration field 990, when rotated into close proximity to the motion magnet 920 by drive hub 945. Drive magnet 950B, attached to drive hub 945 on the other side of acceleration chamber 905, may have an inward-facing side with a south polarity, which may rotate typically substantially synchronously with drive magnet 950A into close proximity to an arm of motion magnet 920 with a south polarity to form another acceleration field 990.

As was described in detail above, drive axle 940 may be powered by any suitable means, such as an internal combustion or electric motor, wind power, etc., for example, which rotates one or more drive hubs 945 with inward-facing drive magnets 950 attached thereto. Repelling force exerted on one or both arms of motion magnet 920 by one or more acceleration fields 990 created by the interaction of inward-facing drive magnets 950 with the arms of motion magnet 920 acts to propel motion magnet 920 out of the acceleration field 990. This repelling force acting on motion magnet 920 may cause motion hub 930 to rotate in a rotation plane parallel to the rotation plane of drive hub 945.

Embodiments of the parallel magnetic motor may have a gearbox functionality, increasing or decreasing the gear ratios between an input drive axle 540 and output motion axle 560. This may be accomplished by changing the number of magnets on a drive hub 545 and/or motion hub 530 rotating in the same rotation plane. For instance, reducing the number of motion magnets 520 on motion hub 530 relative to the amount of drive magnets 550 on corresponding drive hub 545 may cause an increased RPM of the motion hub relative to the drive hub. Increasing the number of drive magnets 550 on a drive hub 545 relative to the amount of motion magnets 520 on corresponding motion hub 530 may also cause an increased RPM of the motion hub relative to the drive hub. In the example embodiment shown in FIG. 11, for example, the number of motion magnets 520 per motion hub 530 may cause the motion hubs 530 and motion axles 560 to rotate at twice the speed as the drive hub 545 and drive axles 540. However, various configurations of motion magnets and/or drive magnet are possible to achieve suitable reduced or increased gear ratios, as was described in detail above.

Because the motion hub 530 and drive hub 545 do not make contact with each other, an advantage of the gearbox of the present disclosure is that it generates little or no heat from friction, exhibits little mechanical wear, and requires little or no lubrication and thus may require much less maintenance or replacement costs than conventional gear assemblies in which the gears interlock.

A parallel magnetic motor 500 embodiment need not have a gearbox effect. For instance, in the example embodiment shown in FIG. 12, each drive hub 545 has four drive magnets 550 and motion hub 530 has four motion magnets 520, such that the drive hubs and motion hub rotate at the same RPM.

Whether or not an embodiment of the present disclosure has the same or other gear ratio between the output and input axles, an advantage of the present disclosure over motors with gears or other similar connections, is that properly spaced magnets (generally, evenly spaced around the drive hub 545 and motion hubs 530) can self-correct into the proper orientation and speed if the rotation speeds of the drive and motion hubs get out of phase. Under the same conditions, conventional gears or similar connections with interlocking parts may be expected to lock, jam or break, necessitating off-line time and repairs.

Drive magnets 550 in parallel motor embodiments may use the same shapes, magnet types and same types and orientation of magnetic shielding for the drive magnets 150 as detailed for right-angle motor embodiments. That is, magnetic shielding may cover all or part of all faces of the drive magnet 550 except for the outermost face (facing the motion magnet 520) and one end. Those skilled in the art will recognize that other known magnet materials, magnet shapes, magnetic shielding, and placement of magnetic shielding may be used for the drive magnets 550.

Motion magnets 520 can be generally the same shape in the parallel motor embodiments as described for motion magnets 120 for the right-angled embodiments of the present disclosure. Thus, motion magnets 520 may be generally "V," "U," or "A" shaped. Similar to the drive magnets 550, the motion magnets 520 may further have magnetic shielding 675 to appropriately redirect the magnetic force emanating from desired edges, which may be substantially similar to the shielding used in on the motion magnets 150 in the right-angled embodiments detailed above. That is, magnetic shielding may cover all or part of the surfaces located at the end of the extensions of the motion magnet 520. Additionally, magnetic shielding may be secured to the upper and lower edge surfaces (see, e.g., FIG. 8). However, those skilled in the art will recognize that other known magnet materials, magnet shapes, magnetic shielding, and placement of magnetic shielding may be used for the motion magnets 520.

Figure 16:
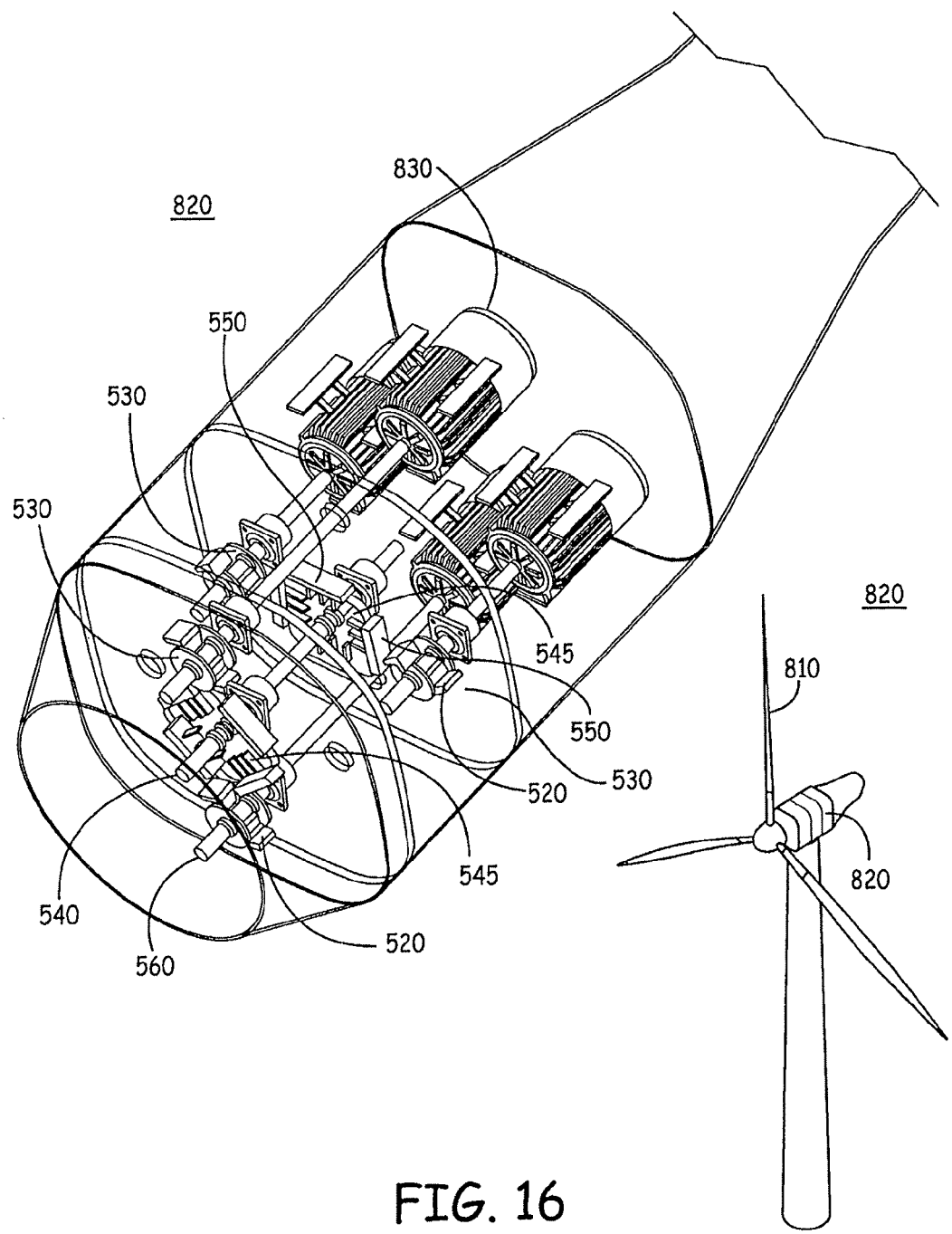
FIG. 16 is a view of a wind turbine incorporating one embodiment of the parallel motor of the present disclosure.

A power supply may further be provided to drive the rotation of one or more drive axles 540. The power supply may be an electric or gasoline motor or any other means capable of driving the drive axles 540, such as water power, steam power, or wind power, as shown in FIG. 16 and described in further detail below.

Typically, each motion magnet 520 will be placed an equal distance from the center of the motion hub 530. However, the motion magnets 520 may be placed at alternating or distinctive distances from the center of the motion hub 550 in some embodiments. Similarly, each drive magnet 550 may be placed an equal, alternating or distinctive distance from the center of the drive hub 545 in some embodiments.

The positioning of the drive magnets 550 of the parallel embodiments of the motor of the present disclosure will be described with reference to a rotating motion of drive magnets 550. However, other motions or combination of motions creating a similar effect can be employed, such as moving, vibrating, pushing, pulling, raising and/or lowering drive magnets 550 away from motion magnets 520 at the appropriate time. The overall effect of the motion is to bring the drive magnets 550 away from an acceleration field generator to allow motion magnets 520 to enter the acceleration field generator.

Alternatively, as described more fully above for right-angle embodiments, the required motion of the drive magnets 550 in and out of proximity to an acceleration field to avoid magnetic lock in parallel embodiments of the present disclosure may be replaced by static, electromagnetic drive magnets, or electromagnetic drive magnets placed in proximity to conventional magnets, in which a magnetic field polarity may be rapidly altered at appropriate times in order to facilitate the entry and exit of motion magnets into an acceleration field.

The operation of the parallel motor embodiments will now be discussed with reference to FIGS. 15A, 15B, and 15C. The drive magnets 550 in the parallel embodiments have been numbered 550A, 550B, 550C and 550D for easier reference while describing the magnetic propulsion motor 500 in operation. Similarly, the motion magnets 520 that are visible in these drawings have been numbered 520A, and 520B.

Figure 15A:
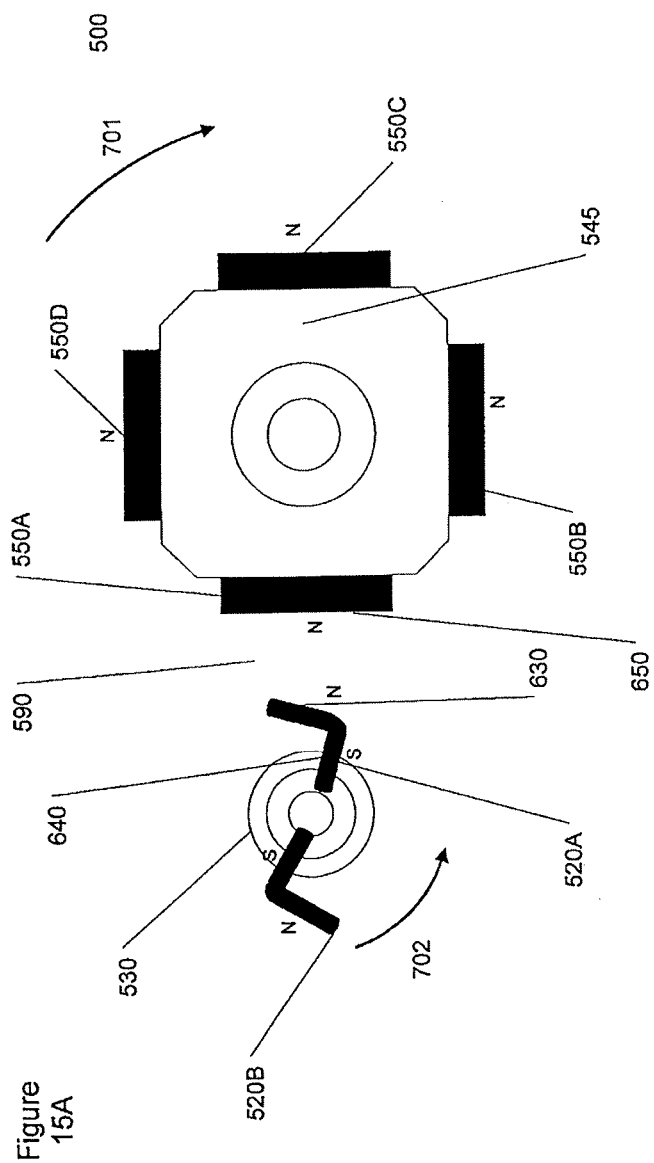
FIGS. 15A-C include several views illustrating one embodiment of a drive magnet of the present disclosure, showing the generation of the acceleration field.

Referring now to FIG. 15A, motion magnet 520A is at a "home" position, generally with side 630 at the midpoint of side 650 of drive magnet 550A, in the center of acceleration field 590. In this embodiment the polarity of side 630 of motion magnets 520A and 520B is north and side 640 is south. Side 650 of drive magnet 550A has a north polarity, i.e., the same polarity as side 630 of motion magnet 520A. Motion hub 530 and drive hub 545 rotate in opposite directions. In this example embodiment, drive hub 545 rotates clockwise, as shown by arrow 701 and motion hub 530 rotates counterclockwise, shown by arrow 702. The rotation and direction of rotation of drive hub 454 is driven by a power source, such as, but not limited to an electric or internal combustion motor, or by alternate means, such as water power, wind power, steam power, etc.

Motion magnets 520A-B and drive magnets 550A-D may have facing sides 630 and 650 all with the same polarity, i.e., all-north or all-south polarities. In some embodiments, the polarities of facing sides 630 and 650 may alternate, as described with regard to the right-angle embodiments. However, whenever sides 630 and 650 will directly face each other in an acceleration field, they should have the same polarity. This creates the repelling force to accelerate motion magnet 520A through and out of the acceleration field 590. This force causes motion magnets 520A-B and therefore rotating hub 530 to rotate about main axle 560.

Figure 15B:
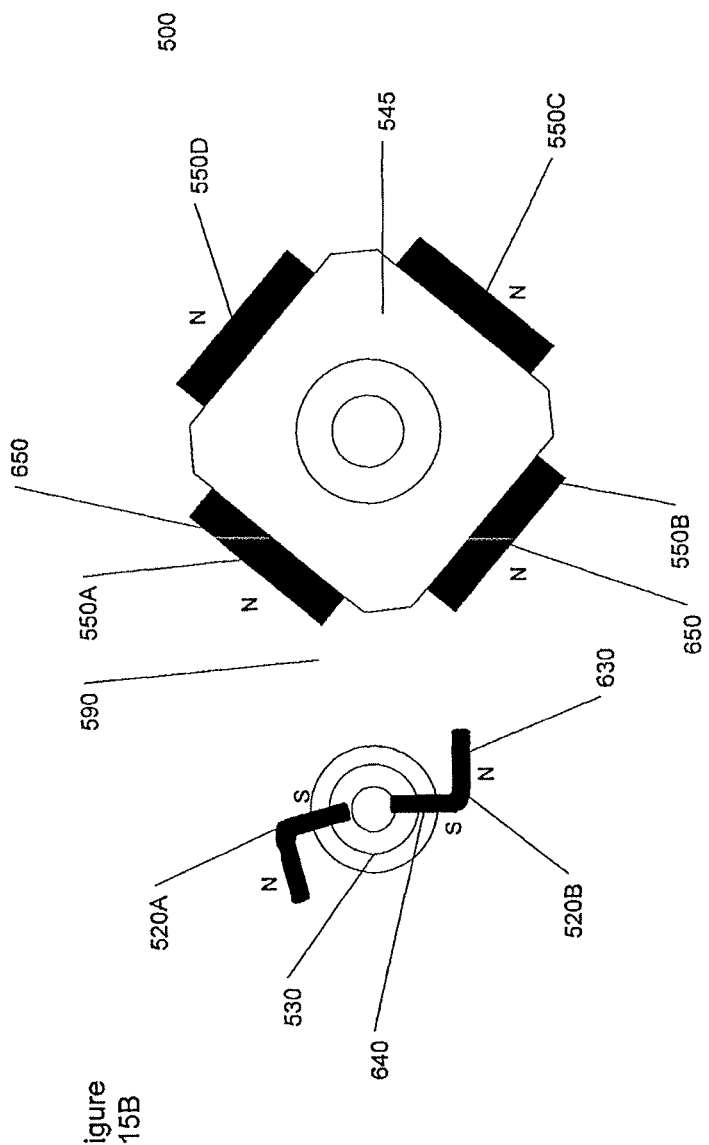

The drive force rotating drive hub 545 clockwise causes drive magnet 550A to rotate away from the acceleration field 590 and 550B to rotate toward it, as shown in FIG. 15B. As can be seen from FIG. 15B, motion magnet 520A has rotated counterclockwise out of the acceleration field 590. At the same time, 520B begins to enter the area where the acceleration field 590 will be created. In this orientation, the acceleration field "window" is open, and the repulsion force between motion magnet 520B and drive magnets 550A and 550B is significantly lower. An acceleration field is once again created as motion magnet 520B is able to rotate into proximity to drive magnet 550B, which exert a repulsive force against each other.

Figure 15C:
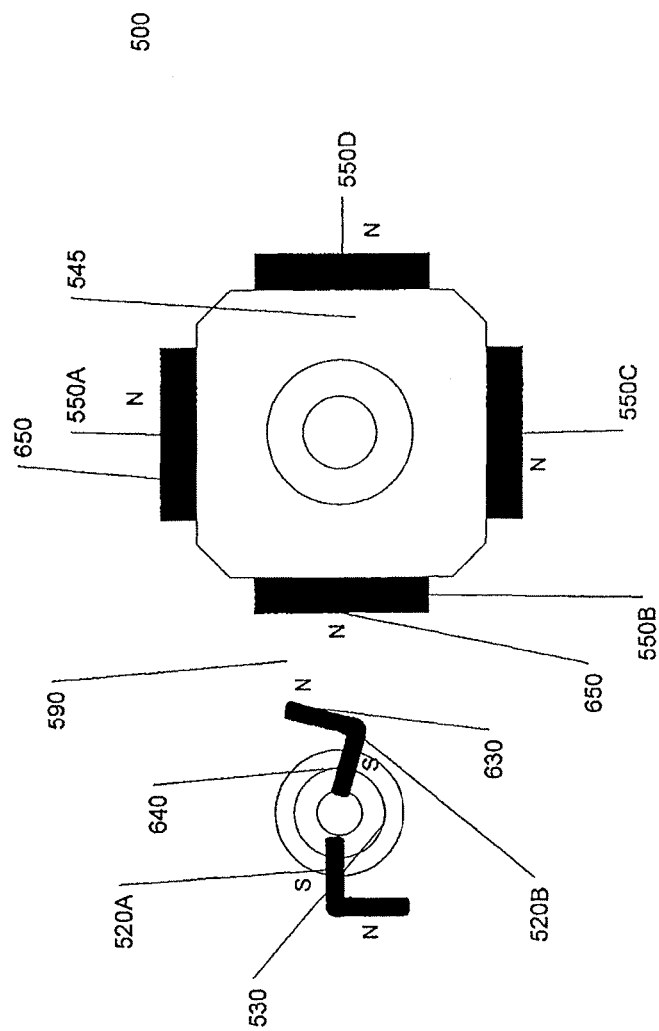

Thus, motion magnet 520B can more easily enter the acceleration field as shown in FIG. 15C. At this position, drive magnet 550B edge 650, has rotated into close proximity to motion magnet 520B, edge 630, i.e., "home" position. As noted above, edge 650 and edge 630 have the same polarity. As the motion hub 530 and drive hub 545 continue to rotate in opposite directions between the orientations in FIGS. 15B and 15C, motion magnet 520B edge 630 is exposed to the full strength of the created acceleration field, between motion magnet 520B and drive magnet 550B.

As can be seen, the rotation directions of the motion hub 530 and drive hub 545 lengthens the time that the motion magnet 520B edge 630 spends in close proximity to the drive magnet 550B edge 650, generating significant repulsive force. Further, the repulsive force caused by the proximity of the same polarity on the drive magnet 550B edge 650 and motion magnet 520B edge 630 also causes the motion hub 530 to rotate further in a counterclockwise direction, imparting torque and/or power to motion axle 560.

The timing of the position of drive magnets 550 and motion magnets 520, thus described, provides for at least two resulting effects. First, an exiting motion magnet, e.g., motion magnet 520A, will be pushed away from the acceleration field created by an interaction with drive magnet 550A, while the next subsequent motion magnet, e.g., motion magnet 520B, which is entering the acceleration field area, faces a much lower repulsive force as it enters the acceleration field because drive magnets 550A and 550B are away from the acceleration filed area as motion magnet 520B enters. Backlash is avoided in the present disclosure because the repulsive force of acting on a motion magnet 520 that is approaching an acceleration field generator 510 is significantly reduced in this manner.

The magnetic motor of the present disclosure may be used in many different situations, such as electricity generation, pumps, electric motors, generators or compressors. Further, the motor of the present disclosure can be used as a power transmission in a gas-powered or electric automobile, and in other situations where a low-friction, low-emission motor may be desirable.

An example use of the motor of the current disclosure is within a wind turbine, as shown in FIG. 16. In a wind turbine 800, drive axle 540 may be driven by turbine blades 810 spinning in winds of various velocities. The drive axle 540 extends into a nacelle 820, inside of which there may be located one or more drive hubs 545 attached to drive axle 540. One or more push or drive magnets 550 may be attached to each drive hub 545.

As shown in FIG. 16, one or more motion magnets 520 may be attached to motion hub 530, which may be attached to a motion axle 560. A drive hub 545 may be rotated by the action of wind on turbine blades 810, which is imparted to drive hub 545 by drive axle 540, which is operably coupled to turbine blades 810. As described above, drive hub 545 may rotate a drive magnet 550 into proximity to a motion magnet 520 attached to motion hub 530, which can freely rotate in the same rotation plane as drive hub 545. An acceleration field may be created by the interaction of drive magnet 550 with motion magnet 520. Acceleration imparted on motion magnet 520 by the acceleration field may cause motion hub 530 and motion axle 560 to rotate. Motion axle 560 may be attached to and impart spin on a rotor of generator 830, which may be used to generate electricity.

As shown in FIG. 16, multiple motion hubs 530 may be present within nacelle 820. In the example embodiment shown in FIG. 16, only one motion hub 530 is attached per motion axle 560, however, as was described fully above, more than one motion hub 530 may be present per motion axle 560. Similarly, any suitable number of motion axles 560 may be utilized. Two drive hubs 545 are attached to drive axle 540 in the example embodiment in FIG. 16, and are rotated by the action of wind on turbine blades 810. However, one, two, or more drive hubs 545 may be attached to drive axle 540 in other embodiments. In the example embodiment of FIG. 16, two motion hubs 530 are paired with a single drive hub 545, however, as was described fully above, one, two, or more motion hubs 530 may be rotated by a drive hub 545.

As was described in detail above, the alignment of multiple motion hubs 530 on a motion axle 560 may be synchronous or offset. In offset alignments, the entry of motion magnets 520 into acceleration fields can be staggered such that the torque imparted on motion axles 560 by the repelling force acting on the motion magnets 520 can be configured to be more constant.

An advantage of an embodiment of the wind turbine motor of the present disclosure is that by varying the sizes of motion hubs relative to the drive hub, suitable RPM for electrical generation may be generated in motion axles 560 by the gearbox properties of the present disclosure. Wind turbines may typically spin a drive axle at a RPM too slow for efficient energy generation; thus, the gear ratio adjustments possible with the ability to adjust the size and number of motion magnets 520 per motion hub 530, and/or drive magnet 550 per drive hub 545 may achieve sufficient motion axle 560 rotation speeds for electrical generation without additional conventional, interlocking gearing.

Furthermore, without interlocking gears, friction can be significantly reduced, allowing for the use of such turbines at lower wind speeds than conventional wind turbines. Also, without interlocking parts, high winds or wind bursts that may cause gearboxes of conventional wind turbines to lock up or break may merely cause the motion and drive hubs of the present disclosure to slip out of phase. The embodiments of the present disclosure allow the out-of-phase hubs to quickly realign on their own. Thus, the embodiment shown in FIG. 16 allows for more efficient generation of electricity from wind turbines because of the reduction of friction and the capture of electricity from lower and higher wind speed areas than with turbines with conventional gearboxes. In addition, there may be reduced maintenance costs because of less frequent breakdowns than with conventional motors, which have more interlocking parts and may need more complicated mechanisms to prevent damage to internal gears caused by excessive wind speeds.

In other embodiments of the motor of the present disclosure, since no mechanical contact is made between the drive magnets and the motion magnets, the system is allowed to operate through solid, non-magnetic, non-conductive structures without any effect on performance. For instance, some components of the motor can be positioned on opposite sides of a wall to transfer energy to, for example but not limited to, clean rooms or bulkheads, etc.

Although the present disclosure has been described with reference to preferred embodiments, persons skilled in the art will recognize that changes may be made in form and detail without departing from the spirit and scope of the disclosure. For example, the distance that the push/drive magnets are from the motion magnets will determine the strength of the attracting and repelling forces. Similarly, the size and/or dimensions of the push magnets and motion magnets will increase or decrease the strength of the attracting and repelling forces. Changing the strength of the attracting and repelling forces will change the amount of torque and/or power created. Further, changing the number of push/drive magnets per spinner assembly or drive hub, and/or motion magnets per rotating hub or motion hub, will change the torque and power created. Further, the number of spinner assemblies per each rotating hub, drive hubs per motion hub, rotating hubs per each spinner assembly, or motion hubs per drive hubs can also affect the power and/or torque created. Changing the number of spinner assemblies powered by each spinner axle or rotating hubs on each main axle, or drive hubs powered by each drive axle, and motion hubs per motion axle can also affect the power and/or torque created. In embodiments where multiple rotating hubs are present on one main axle, offsetting the orientation of the motion magnets in each rotating hub from the other rotating hubs on the same axle, or motion magnets in each motion hub from the other motion hubs on the same axle can also affect the power and/or torque created.

I claim:

1. A magnetic motor comprising:
   a first drive magnet;
   a first electromagnet coupled to or positioned near the first drive magnet, altering the magnetic field of the first drive magnet when energized with an electric current;
   a first motion magnet; and
   a first acceleration field created by the interaction between the first drive magnet coupled to or positioned near the first electromagnet and the first motion magnet as the first motion magnet is passed through the magnetic field of the first drive magnet as altered by the first electromagnet.

2. The magnetic motor of claim 1, wherein the first electromagnet is positioned near a first end of the first drive magnet.

3. The magnetic motor of claim 2, further comprising a rotatable output shaft wherein the first motion magnet is operably coupled to the output shaft and rotates around the central axis of the output shaft.

4. The magnetic motor of claim 3, further comprising a second motion magnet operably coupled to the output shaft.

5. The magnetic motor of claim 4, wherein the second motion magnet is operably coupled to the output shaft at a location that is longitudinally up or down shaft from the first motion magnet.

6. The magnetic motor of claim 5, wherein the first and second motion magnet are radially offset from one another around the output shaft.

7. The magnetic motor of claim 6, further comprising:
a second drive magnet;
a second electromagnet coupled to or positioned near the second drive magnet, altering the magnetic field of the second drive magnet when energized with an electric current; and
a second acceleration field created by the interaction between the second drive magnet coupled to or positioned near the second electromagnet and the second motion magnet as the second motion magnet is passed through the magnetic field of the second drive magnet as altered by the second electromagnet.

8. The magnetic motor of claim 1, wherein the electromagnet is energized by electric current at intermittent intervals.

9. The magnetic motor of claim 1, wherein the electromagnet is energized continuously with electric current, and the amount of electric current is increased and decreased at intermittent intervals.

10. The magnetic motor of claim 1, further comprising a second drive magnet coupled to or positioned near a second electromagnet, altering the magnetic field of the second drive magnet when energized with an electric current, wherein the acceleration field is created by the interaction between the first drive magnet and first electromagnet, the second drive magnet and second electromagnet, and the motion magnet as the motion magnet is passed through the altered magnetic fields of the two drive magnets substantially simultaneously.

* * * * *